US007031907B1

(12) United States Patent
Passaretti et al.

(10) Patent No.: US 7,031,907 B1
(45) Date of Patent: Apr. 18, 2006

(54) TOOL FOR CONSTRUCTING VOICE RECOGNITION GRAMMARS

(75) Inventors: Christopher F. Passaretti, Smithtown, NY (US); Daniel D. Evans, Huntington, NY (US)

(73) Assignee: Nortel Networks Limited, St. Laurent (CA)

( * ) Notice: Subject to any disclaimer, the term of this patent is extended or adjusted under 35 U.S.C. 154(b) by 830 days.

(21) Appl. No.: 09/978,814

(22) Filed: Oct. 15, 2001

(51) Int. Cl.
*G06F 17/28* (2006.01)
(52) U.S. Cl. .............................. 704/2; 704/9; 704/257; 704/235; 725/47; 725/48; 717/3; 717/105
(58) Field of Classification Search ............. 704/2, 704/9, 257, 235; 725/47, 44; 717/3, 105
See application file for complete search history.

(56) References Cited

U.S. PATENT DOCUMENTS

| | | | | |
|---|---|---|---|---|
| 4,730,270 | A * | 3/1988 | Okajima et al. ............... | 704/2 |
| 5,748,841 | A * | 5/1998 | Morin et al. ................. | 704/257 |
| 5,884,249 | A * | 3/1999 | Namba et al. ................. | 704/9 |
| 5,991,712 | A * | 11/1999 | Martin ........................ | 704/9 |
| 6,442,755 | B1 * | 8/2002 | Lemmons et al. ............ | 725/47 |
| 6,611,802 | B1 * | 8/2003 | Lewis et al. ................. | 704/235 |
| 2002/0007483 | A1 * | 1/2002 | Lopez ........................... | 717/3 |
| 2002/0032762 | A1 * | 3/2002 | Price et al. ................... | 709/223 |
| 2003/0051243 | A1 * | 3/2003 | Lemmons et al. ............ | 725/44 |
| 2004/0107414 | A1 * | 6/2004 | Bronicki et al. ............ | 717/105 |

OTHER PUBLICATIONS

Erbach'95 ("ProFIT: Prolog with Features, Inheritance and Templates", 7th conference on European chapter of the Association for Computational Linguistics, Mar. 1995).*

Vion-Dury et al ("A Structured Interactive Workspace For A Visual Configuration Language", IEEE Symposium on Visual Languages, Sep. 1997).*
Erbach'92 ("Tools For Grammar Engineering", Proceedings of the 3rd conference on Applied natural language processing, Mar. 1992).*
Periphonics Siberia ("Nortel Networks, Periphonics Siberia Visual Construction of Voice-Recognition Grammars", presentation ©2000).*
Nortel Networks, *Periphonics Siberia Visual Construction of Voice-Recognition Grammars*, 18 pages. Publication Date 2000: The exact disclosure date has not been determined, but the disclosure is sufficiently earlier than one year before the effective U.S. filing date so that the particular month of publication is not an issue.

* cited by examiner

*Primary Examiner*—Vijay B. Chawan
(74) *Attorney, Agent, or Firm*—Haynes and Boone, LLP

(57) ABSTRACT

A voice recognition grammar ("VRG") tool for facilitating the creation of speech grammars for speech recognition applications is described. The VRG tool 114 uses syntax diagrams to enable a developer to visually build vendor-independent speech recognition grammars. The grammars are built from visual components called blocks, which represent the elements of a grammar. Blocks are connected and assigned values to define a grammar. A grammar is built with the VRG tool within a "Construction Area" by selecting blocks from a "Tool Kit." Every phrase must start with a start block and be completed with an end block, with the various grammar blocks being connected between them. Once the syntax for the grammar is constructed, using the aforementioned blocks labeled and defined appropriately, a grammar specific to the selected vendor may be generated and is then ready for use by a voice recognition application.

18 Claims, 31 Drawing Sheets

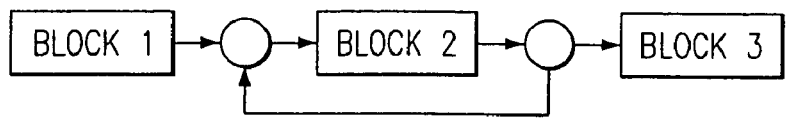
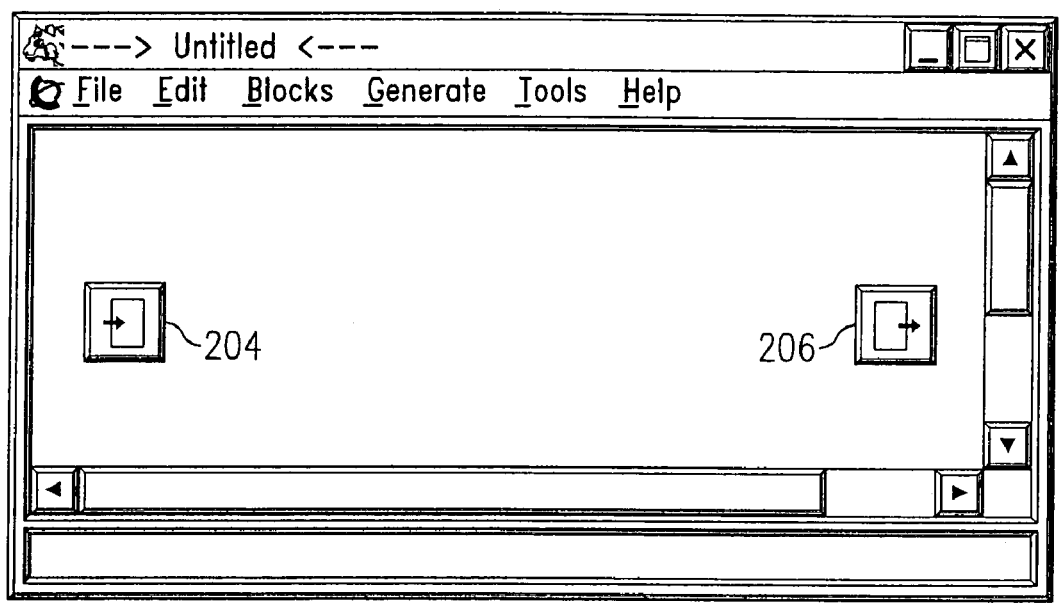
Fig. 2a
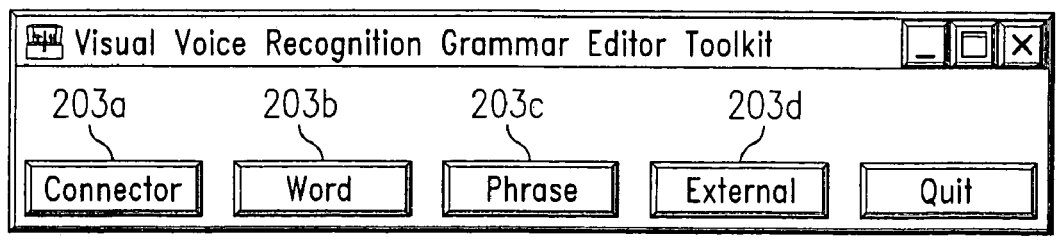
Fig. 2b

| Buttons | Representation | Description |
| --- | --- | --- |
| Connector | ○ <br> ▢(○) | Connects blocks in order of execution. <br> When yellow — contains path information. <br> For additional information, see *Connector Block* on page 61. |
| Word | ( Word1 ) | A word to be recognized. |
| Phrase | [ Phrase1 ] | Logical group of words. |
| External | ⟨ External1 ⟩ | Phrases/grammars which are defined externally. <br> For additional information, see *External Block* on page 57. |
| Quit | [ Quit ] | You will be prompted to save the grammar if there are unsaved changes, before the program exits. |

*Fig. 3*

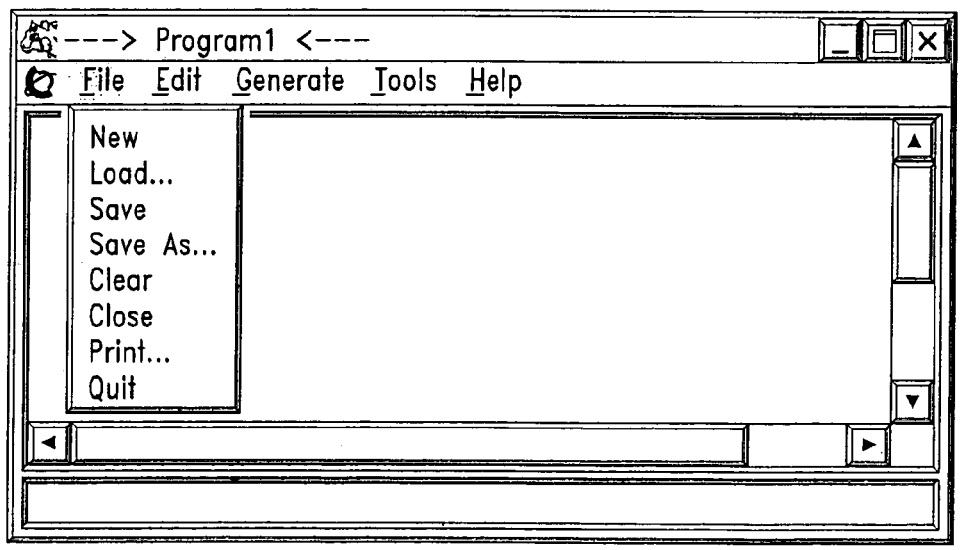

TOOL FOR CONSTRUCTING VOICE RECOGNITION GRAMMARS

BACKGROUND OF THE INVENTION

The invention relates generally to speech recognition tools and, more particularly, to a speech recognition grammar ("SRG") tool for facilitating the creation of grammars for speech recognition tools.

Speech recognition is a process of recognizing one or more words or phrases spoken by a user. A SRG provides a recognizer with information about the expected input. By knowing the structure of the expected input, a recognizer can narrow its choices and thus allow a wider range of voice quality and intonation to be correctly identified. The recognition is based on what the user says, as well as a vocabulary and, perhaps, a grammar. A grammar is a set of rules that limit the recognition tasks to a specific set of words and/or phrases. In an effort to improve recognition accuracy, a speech recognition tool, or "recognizer," is typically advised as to which words and/or phrases (or word sequences) are valid in the application. Grammar rules vary between various recognizers; therefore, to develop a grammar for a particular recognizer, a developer is required to be familiar with the particular rules and syntax applied by the vendor of the particular recognizer. Accordingly, if a developer develops grammars for multiple recognizers, he or she must be familiar with multiple sets of rules and syntaxes.

Therefore, what is needed is a system and method for simplifying the development of grammars for multiple recognizers available from different vendors.

SUMMARY OF THE INVENTION

In one embodiment, the invention is a speech recognition grammar ("SRG") tool for facilitating the creation of speech grammars for speech recognition applications. In particular, the SRG tool uses syntax diagrams to enable a developer to build vendor-independent speech recognition grammars. The grammars are built visually in construction areas from graphical components called blocks, which represent the elements of a grammar. Blocks are connected and assigned values to define a grammar. The various blocks implemented by the SRG tool include "word blocks," which represent the words or letters that are acceptable as input at a specific location in the grammar; "phrase blocks," which represent a new construction area where a subgrammar can be defined for a particular phrase; "external blocks," which identify grammars defined outside of the SRG tool and include, for example, drop-in grammars, subgrammars, and runtime variables; "reference blocks," which point to an existing phrase block to enable a phrase to be defined once and used multiple times; and "connector blocks," the properties of which may contain important path information specific to the current vendor.

A grammar is built with the SRG tool within a "Construction Area" by selecting blocks from a "Tool Kit." Every phrase must start with a start block and be completed with an end block, with the various grammar blocks being connected between them. Once the diagram for the grammar is constructed, using the aforementioned blocks labeled and defined appropriately, a vendor grammar may be generated and is then ready for use by a speech recognition system.

A technical advantage achieved with the invention is that it can be used to construct grammars in a vendor-independent manner for a number of different speech recognition systems.

BRIEF DESCRIPTION OF THE DRAWINGS

FIG. 1E is a flow diagram illustrating a grammatical element used by one embodiment of the present invention.

FIGS. 2A and 2B respectively illustrate a Construction Area and a Tool Kit of the SRG tool of FIG. 1.

FIG. 3 is a table illustrating graphical representations of blocks used by the SRG tool of FIG. 1.

FIGS. 4A–4D respectively illustrate various pull-down menus of the Construction Area of FIG. 2A.

DETAILED DESCRIPTION OF A PREFERRED EMBODIMENT

In the following description, well-known elements are presented without detailed description in order not to obscure the present invention in unnecessary detail. For the most part, details unnecessary to obtain a complete understanding of the present invention have been omitted inasmuch as such details are within the skills of persons of ordinary skill in the relevant art.

Figure 1A:
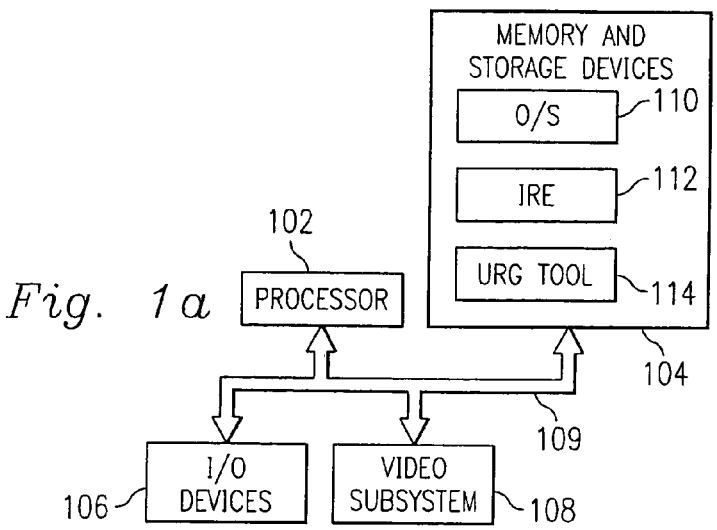
FIG. 1A is a block diagram of a computer system embodying features of one embodiment of a SRG tool.

FIG. 1A illustrates a computer system 100 embodying features of the present invention. In particular, the computer system 100 is a conventional computer system, such as a personal computer ("PC"), comprising a processor 102, memory and storage devices 104, a variety of input/output devices and respective controllers and drivers, collectively represented by an I/O device 106, and a display subsystem 108, all interconnected in a conventional manner via one or more buses, represented in FIG. 1 by a bus 109. In accordance with features of the present invention, the computer system 100 also has installed thereon an operating system 110, which in the preferred embodiment is WINDOWS® NT/95 or higher, commercially available from Microsoft Corporation, or SOLARIS® v. 2.5 or higher, commercially available from Sun Microsystems, Inc., and Java Runtime Environment ("JRE") v. 1.3 or higher, designated in FIG. 1 by a reference numeral 112 and commercially available from Sun Microsystems, Inc. Installation of PERIPRODUCER® (release 2.3) (not shown), commercially available from Nortel Networks, Inc., is optional. PERIPRODUCER is a software suite for developing interactive transactional processing applications for voice or web presentation. Additionally, a SRG tool 114, which will be described in greater detail below, is also installed on the computer system 100.

The SRG tool 114 does not include grammar compilers, which are vendor specific. Table I below lists examples of vendors/products that may be supported by the SRG tool 114:

TABLE I

|  | NUANCE | BBN | Java Speech Grammar Format (JSGF) | Philips |
| --- | --- | --- | --- | --- |
| Grammar is Defined | By the Vendor | By the Vendor | Standard conventions based on Java programming language | By the Vendor |
| Variable Definitions | Yes | No | No | No |
| Public Definitions | No | No | Yes | Yes |
| Parsing | NL slot and return | Tag | Tag | Tag |
| Labels | No | Yes | No | No |
| File Extension | .grammar | .hg | .jsgf | .grm |

It will be recognized that the vendors listed in Table I are representative only and that use of the SRG tool 114 is not limited to those vendors listed in Table I, but may be used to support any vendor grammar format.

As will be explained in greater detail below, the SRG tool 114 provides a visual area or "construction" area on a display of computer system 100 on which to construct a syntax diagram.

Figure 1B:
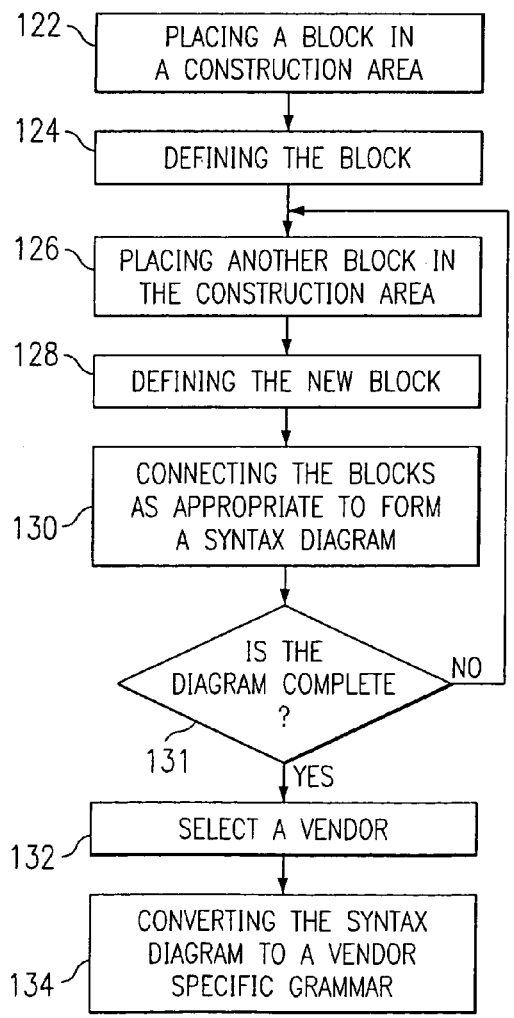
FIG. 1B is a flow diagram of a method used by one embodiment the present invention.
Figure 1C:
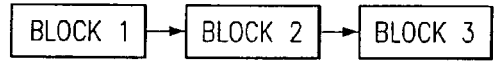
FIG. 1C is a flow diagram illustrating a grammatical element used by one embodiment of the present invention.
Figure 1D:
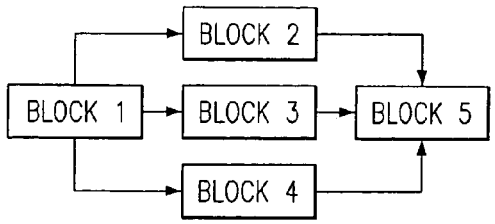
FIG. 1D is a flow diagram illustrating a grammatical element used by one embodiment of the present invention.

Turning now to FIG. 1B, there is presented a method 120 for visually creating a syntax diagram and generating a vendor grammar. In step 122, a user may place a block in the construction area (not shown in FIG. 1B). In step 124, the block may be defined to be an element of grammar. Such elements of grammar may include a word, phrase, or connector. The block may further be "labeled" with a string entry.

After the first block has been defined and placed in the construction area, in step 126 another block may be placed in the construction area. In step 128, the appropriate element of grammar may also be defined for this block. In step 130, the blocks may be visually connected with a graphic element, such as a line. As will be explained in greater detail below, the line represents a relationship between the blocks. The ordered combination of blocks and lines creates a syntax diagram. The syntax diagram is, therefore, a visual representation of the elements of grammar and the grammatical relationships between the appropriate elements.

Turning back to FIG. 1b, if the syntax diagram is not complete (step 131), steps 126 through 130 may be repeated until the user has finished constructing the syntax diagram by adding and defining additional blocks and lines. The syntax diagram may then be stored to a permanent memory device, such as a hard drive.

Once constructed, in step 132, the user may select a specific vendor. In step 134, the syntax diagram may then be converted into the specific grammar format for the chosen vendor. The SRG tool 114 converts the syntax diagram into a multitude of vendor specific formats.

The SRG tool 114 converts the syntax diagram into the appropriate grammar by recursively analyzing the grammatical elements and their "connections" or relationships to each other (which are visually represented as lines and connector elements). This recursive analysis allows the syntax diagram to be decompose into sequences, alternatives, and cycles. For instance, a block which has a single exiting connection is a participant in a sequence. A sequence is graphically illustrated in FIG. 1d. On the other hand, a block which has multiple exiting connections begins an alternative or a cycle. An alternative is graphically illustrated in FIG. 1e. Yet, a block which has multiple entering connections is a termination point for a cycle or an alternative. A cycle is illustrated in FIG. 1f.

Alternatives, sequences, and cycles have specific format representations in every current speech recognition vendor grammar. Thus, after a syntax diagram has been decomposed into these generic parts, the parts can in turn be used to generate a specifically formatted text-based grammar which has been formatted to meet the user-selected vendor's format requirements.

In order to describe present invention, an exemplary embodiment will be discussed below in reference to FIGS. 2 through 15. It is important to note that this discussion illustrates only one embodiment of the present invention, and should not be construed to be limiting the scope of the present invention.

Referring now to FIGS. 2A and 2B, when the SRG tool 114 is started, a Construction Area 200 and Took Kit 202 will be displayed. As will be described in greater detail below, a grammar is built with the SRG tool 114 within the Construction Area 200 by selecting blocks by clicking on corresponding buttons 203a–203d of the Tool Kit 202. In this embodiment, the grammars begin with a start block 204 and are completed with an end block 206, with the various grammar blocks connected between the blocks. FIG. 3 is a table illustrating each of the various types of blocks, the iconic representation of the block in the Construction Area 200, and a description of the block. As indicated in FIG. 3, start and end blocks may begin and complete every phrase, respectively. Connector blocks may connect blocks in order of execution and when yellow indicate that path information is included therein. A word block may represent a word to be recognized, a phrase block represents a logical group of words, an external block represents a phrase or grammar that is defined externally. In one embodiment, selecting "Quit" from the Tool Kit 202 results in the user being prompted to save the work if there are unsaved changes thereto before the SRG tool 114 is exited.

Referring again to FIG. 2A, the Construction Area 200 may include several pull-down menus. For example, as shown in FIG. 4A, a "File" pull-down menu includes a "New" menu pick, which enables a user to create a new grammar; a Load menu pick, which enables a user to open an existing grammar to view or make changes; a "Save" menu pick, which enables a user to save changes to the current grammar; a "Save As" menu pick, which enables a user to save the current grammar with a new name; a "Clear" menu pick, which enables a user to empty the construction area; a "Close" menu pick, which enables a user to close a sub-grammar construction area; a "Print" menu pick, which enables a user to print out the current grammar, and a "Quit" menu pick, which enables a user to close the SRG tool 114.

Figure 4B:
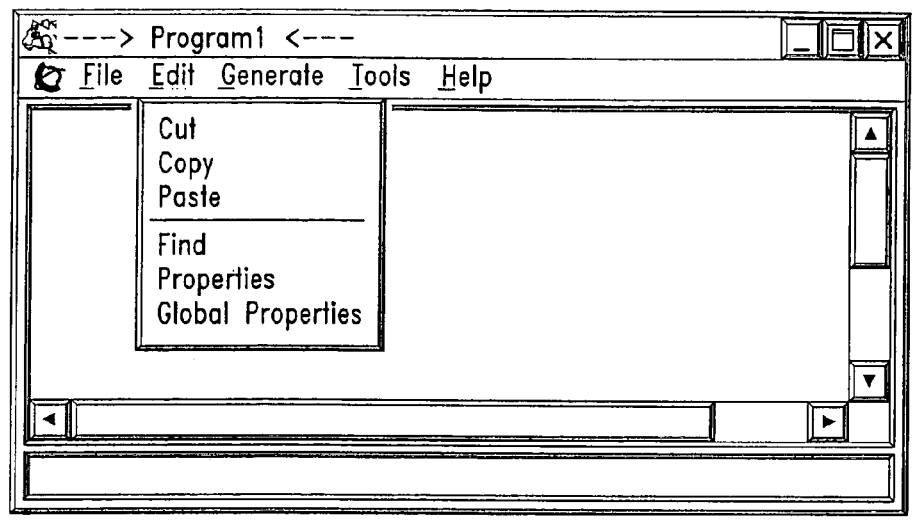

Referring now to FIG. 4B, an "Edit" pull-down menu may include "Cut," "Copy," and "Paste" menu picks, which enable the functions typically respectively ascribed to those terms in Windows-based programs; a "Find" menu pick, which enables a user to locate a word within a grammar; a "Properties" menu pick, which enables a user to display the properties of the current grammar, including label, variable, and package information; and a "Global Properties" menu pick, which enables a user to make changes that affect all grammars created using the SRG tool 114.

Figure 5A:
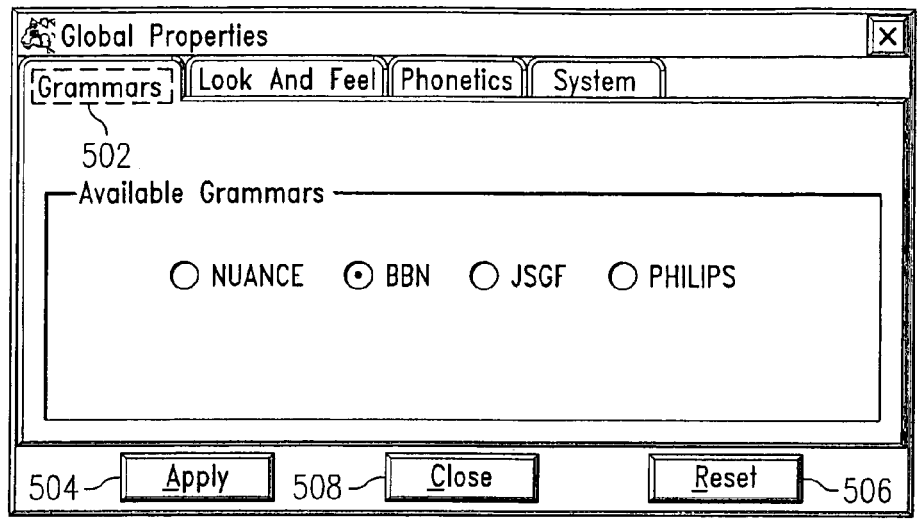
FIGS. 5A–5D illustrate various tabs of a Global Properties dialog box of the SRG tool of FIG. 1.

Selection of the Global Properties menu pick may result in the display of a tabbed Global Properties dialog box 500, as shown in FIGS. 5A–5D. FIG. 5A illustrates the Global Properties dialog box 500 with a Grammars tab 502 selected. This tab 502 enables the user to select the vendor for which the grammar will be used. Clicking an "Apply" button 504 causes the changes to take effect. Clicking a "Reset" button 506 returns to the prior settings. Clicking a "Close" button 508 exits the Global Properties dialog box 500.

Figure 5B:
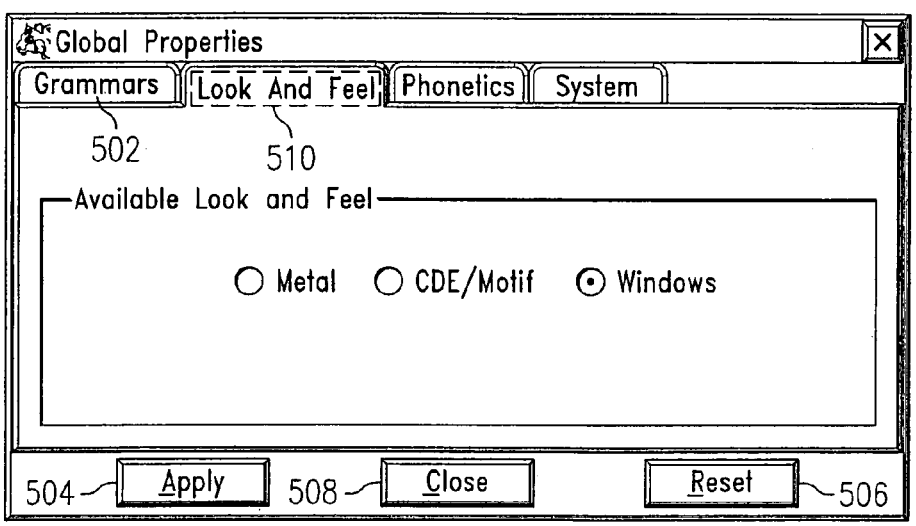
Figure 5C:
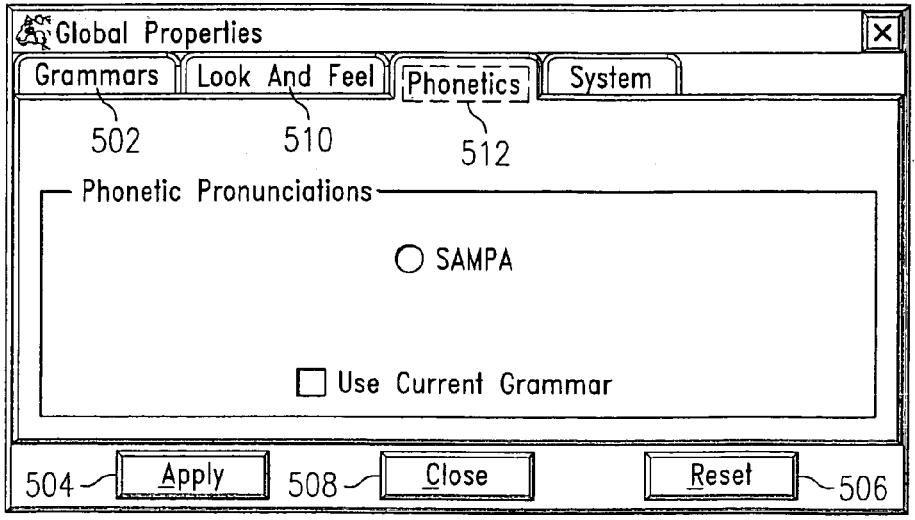
Figure 5D:
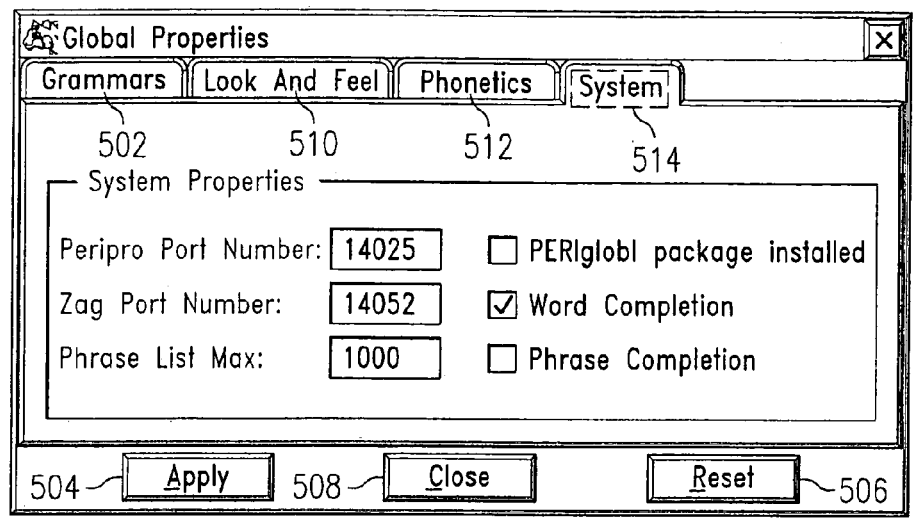

FIG. 5B illustrates the Global Properties dialog box 500 with a Look and Feel tab 510 selected. This tab 510 enables the user to select the desired look and feel for grammars created using the SRG tool 114. FIG. 5C illustrates the Global Properties dialog box 500 with a Phonetics tab 512 selected. Using the word block, the phonetic pronunciation of a word can be specified. Typically, each vendor defines its own pronunciation phonemes. The Phonetics tab 512 enables the user to specify whether to use vendor's phonemes or another industry standard, such as Speech Assessment Methods Phonetics Alphabet ("SAMPA"). FIG. 5D illustrates the Global Properties dialog box 500 with a System tab 514 selected. This tab 514 enables a user to specify certain system settings for the SRG tool 114.

Figure 4C:
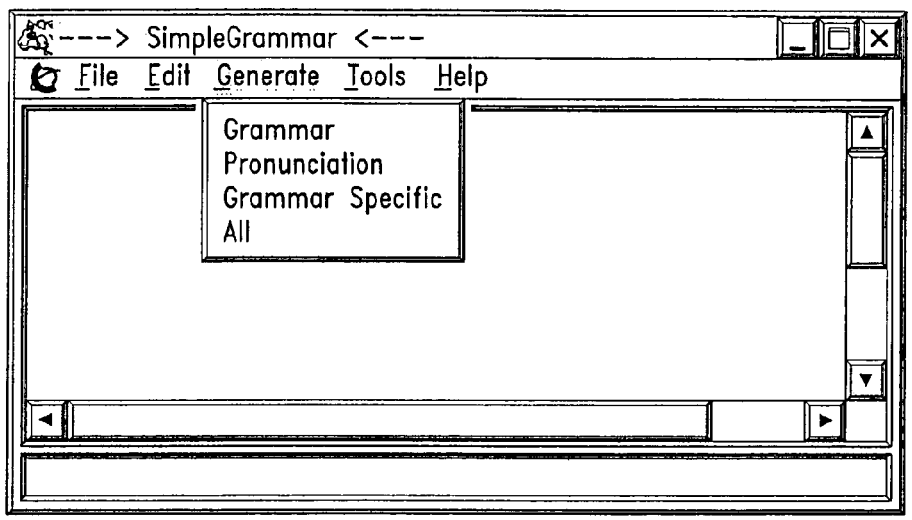

Referring now to FIG. 4C, a "Generate" pull-down menu may include a "Grammar" menu pick, which enables the user to generate grammars in the format of the currently selected vendor; a "Pronunciation" menu pick, which enables the user to generate pronunciation files (if supported) in the format of the currently selected vendor; a "Grammar Specific" menu pick, which enables the user to generate vendor-specific files created for the current grammar, if the vendor requires such files and the current grammar needs such files; and an "All" menu pick, which enables the user to generate the grammar, pronunciation, and vendor-specific files described above.

Figure 4D:
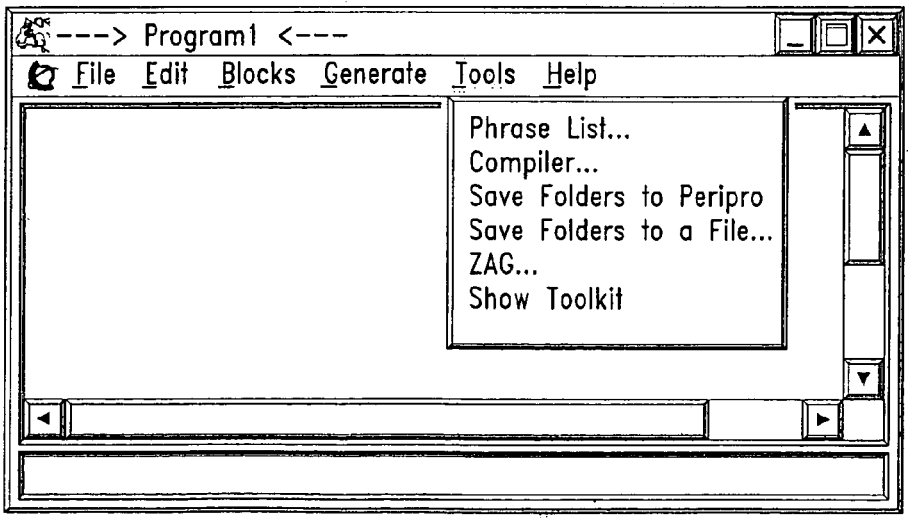

Referring now to FIG. 4D, a "Tools" pull-down menu may include a "Phrase List" menu pick, which provides a list of acceptable phrases; such as a "Compiler Tool" menu pick, which provides access to vendor-owned compilers; a "Save Folders to PeriPro" menu pick, which saves the grammar to a PERIPRODUCER program; a "Save Folders to a File" menu pick, which saves the grammar to a file; a "ZAG" ("Zero Administration Grammar") menu pick, which enables the user to transfer the current grammar to any system, and a "Show Toolkit" menu pick, which opens the Tool Kit 202 if it is closed or minimized.

Figure 6A:
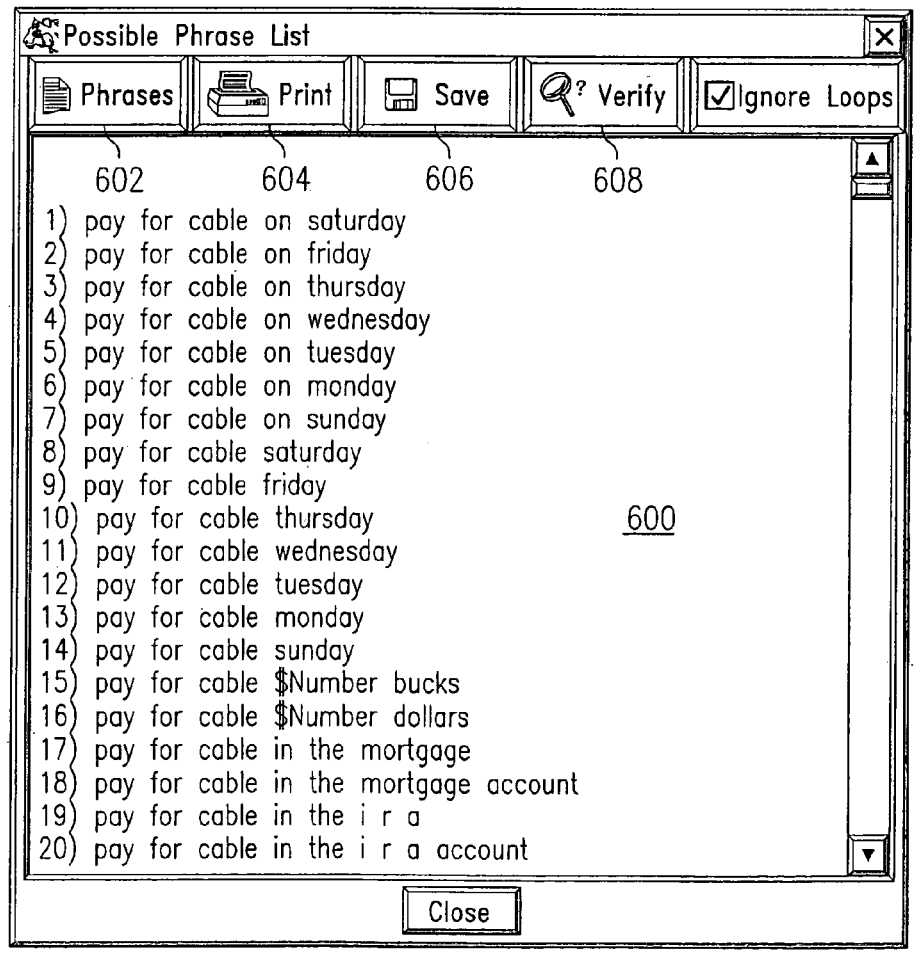
FIG. 6A illustrates a phrase list generated using the SRG tool of FIG. 1.
Figure 6B:
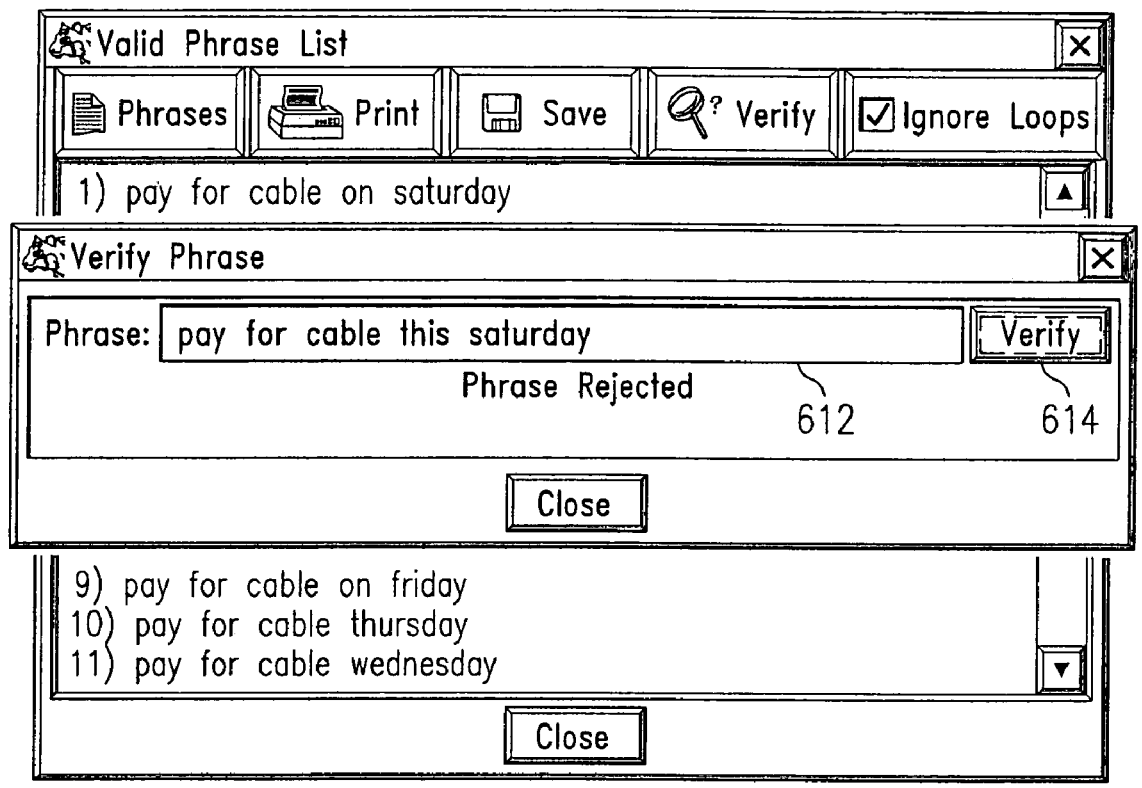
FIG. 6B illustrates a Verify Phrase dialog box of the SRG tool of FIG. 1.

Selection of the Phrase List menu pick enables the user to generate a phrase list. A phrase list can be generated any time after the grammar file has been saved. An exemplary phrase list 600 is illustrated in FIG. 6A. Clicking on a "Phrases" button 602 results in the display of a phrase list, such as the phrase list 600. Clicking on a "Print" button 604 results in the phrase list 600 being printed. Clicking on a "Save" button 606 saves the phrase list 600 to a user-selected directory. Clicking on a "Verify" button 608 results in the display of a Verify Phrase dialog box 610, as shown in FIG. 6B, which enables the user to verify a phrase as follows. Using the Verify Phrase dialog box 610, the user enters the phrase to be verified in a Phase field 612 and clicks on a "Verify" button 614. A notation may appear at the bottom of the dialog box 610 indicating whether the phrase was accepted (i.e., the phrase was located in the phrase list) or rejected (e.g., if the phrase is misspelled or is not located in the phrase list).

Figure 7A:
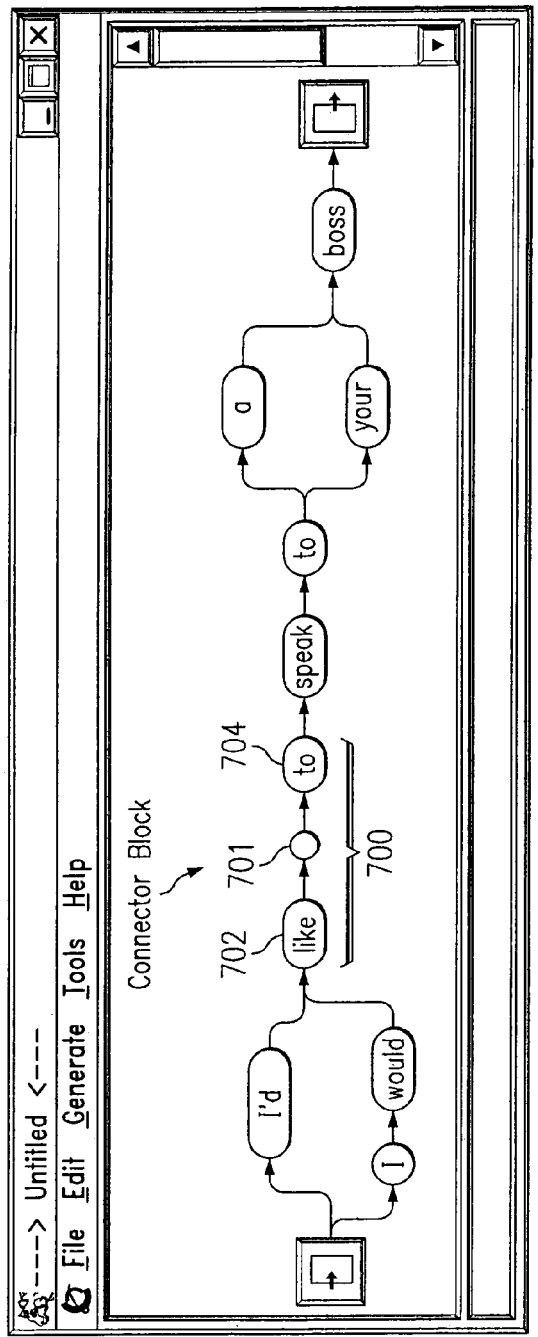
FIG. 7A illustrates the use of connections in a grammar created using the SRG tool of FIG. 1.

Referring now to FIG. 7A, there is illustrated a connection 700, including a connector block 701, connecting a "like" word block 702 with a "to" word block 704. In the illustrated exemplary embodiment, connector blocks, such as the connector block 701, can also be used after an alternative phrase, as described below, as well as to loop a grammar, as also described below. The block can also be used to separate blocks and phrases with no meaning at all, having no effect on the resulting grammar (i.e., can be used for purely aesthetic reasons).

Connector blocks can be used to contain "path" information that is useful to the recognizer to interpret what was input. Were this path information not available, the recognizer would have to parse the input. For example, the following four phrases all have the same meaning:

1. transfer $100 from checking to savings;
2. please transfer to savings $100 from my checking account;
3. transfer to savings from checking $100; and
4. take $100 from my checking account and transfer it to my savings account.

Clearly, it would be difficult for a recognizer to parse all of the above entries (and these are only a small sampling of the number of alternatives for expressing the same command) and determine therefrom the intent of the user. Using connector blocks, path information can be inserted into the input to enable the recognizer to determine what was spoken. Taking the same phases, but assuming the grammar contains path information (denoted by brackets), the phrases read as follows:

1. transfer {<command transfer>} $100 {<amount 100>} from checking {<from checking>} to savings {<to savings>};
2. please transfer {<command transfer>} to savings {<to savings>} $100 {<amount 100>} from my checking account {<from checking>};
3. transfer {<command transfer>} to savings {<to savings>} from checking {<from checking>} $100 {<amount 100>}; and
4. take $100 {<amount 100>} from my checking account {<from checking>} and transfer {<command transfer>} it to my savings account {<to savings>}.

Now, along with the spoken input, the recognizer will receive the path information and in all of the above cases, the following path information will be returned:

<command transfer>
<amount 100>
<from checking>
<to savings>

This path information enables a recognizer to easily determine what has been spoken.

An informative connector block (one which is yellow) may provide information regarding the progress of the recognition, as describe above. Recognition can be considered to follow one of the paths in the syntax diagram from the start block to the end block in a construction area. When an informative connector is in the path, it provides information to the recognizer that defines the path taken. For example, if the word "five" is in a word block and the word block is followed by an informative connector, the information defined in the connector block might append the digit "5" to the output generated by the recognizer, thus identifying the path taken, and by implication, the phrase recognized.

Figure 7B:
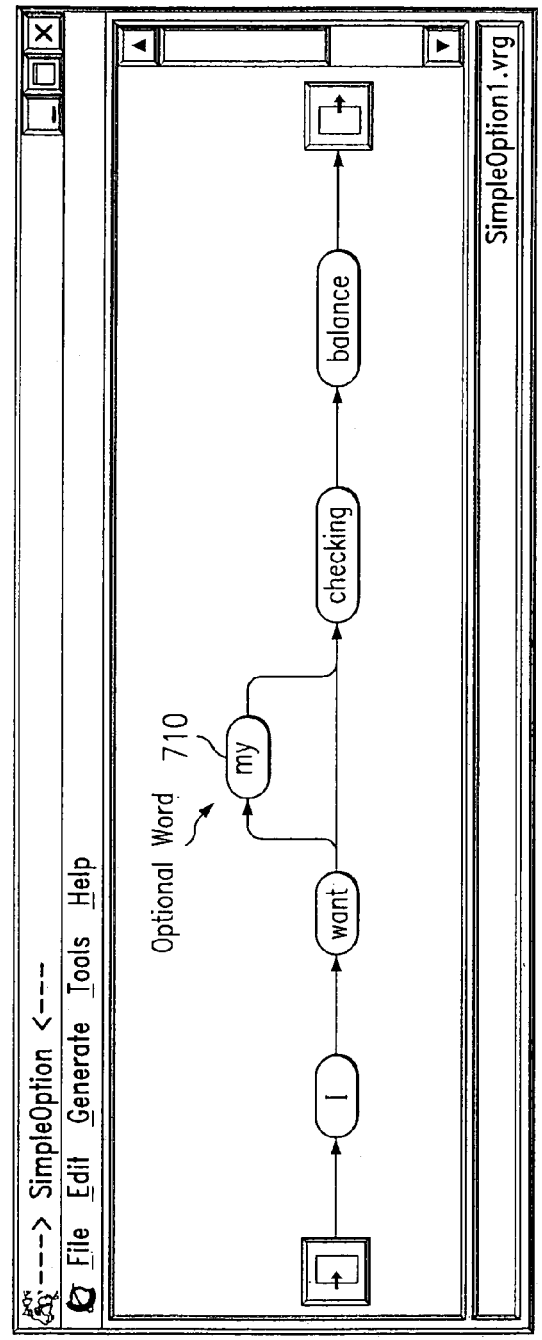
FIG. 7B illustrates the use of an optional word in a grammar created using the SRG tool of FIG. 1.

FIG. 7B illustrates use of an optional word 710, which is a word in a phrase that does not necessarily need to be spoken. The grammar will recognize the phrase with or without the optional word. In the example shown in FIG. 7B, the optional word is "my". The grammar will recognize both "I want my checking balance," as well as "I want checking balance." Since "want" and "checking" are connected, "my" can be omitted and the response will be valid and recognized.

Figure 7C:
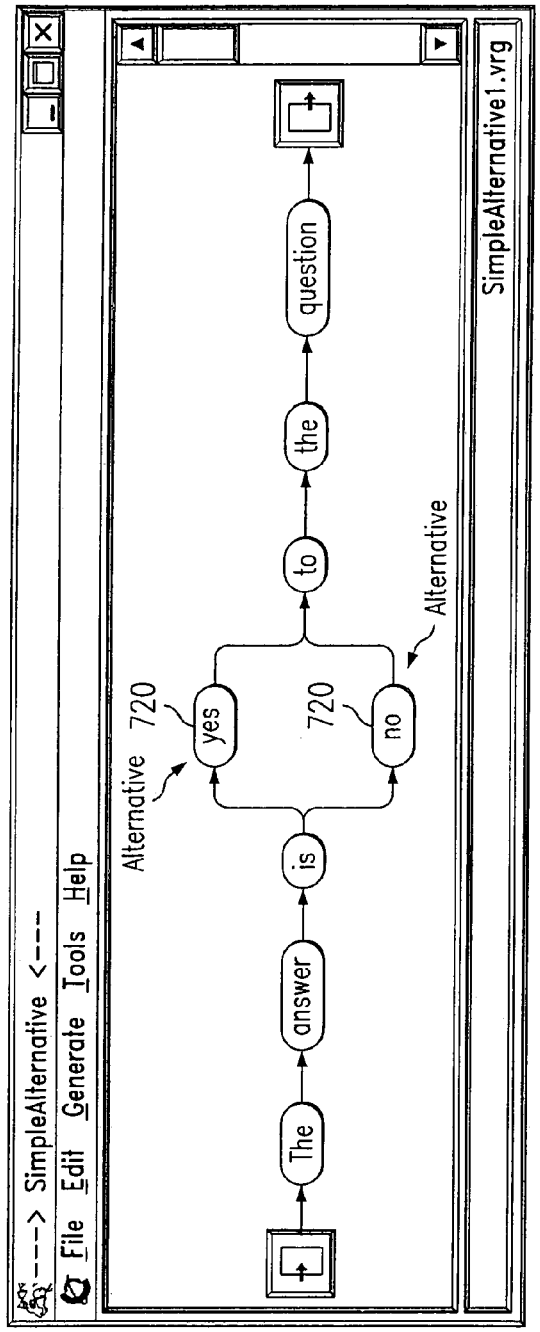
FIG. 7C illustrates the use of an alternative word in a grammar created using the SRG tool of FIG. 1.

FIG. 7C illustrates one use of alternative words 720. An alternative word or phrase is one that may be substituted for another word or phrase. The grammar will recognize the phrase using either alternative. In the example shown in FIG. 7C, one valid response is "The answer is yes to the question" and the other (alternative) valid response is "The answer is no to the question."

Figure 7D:
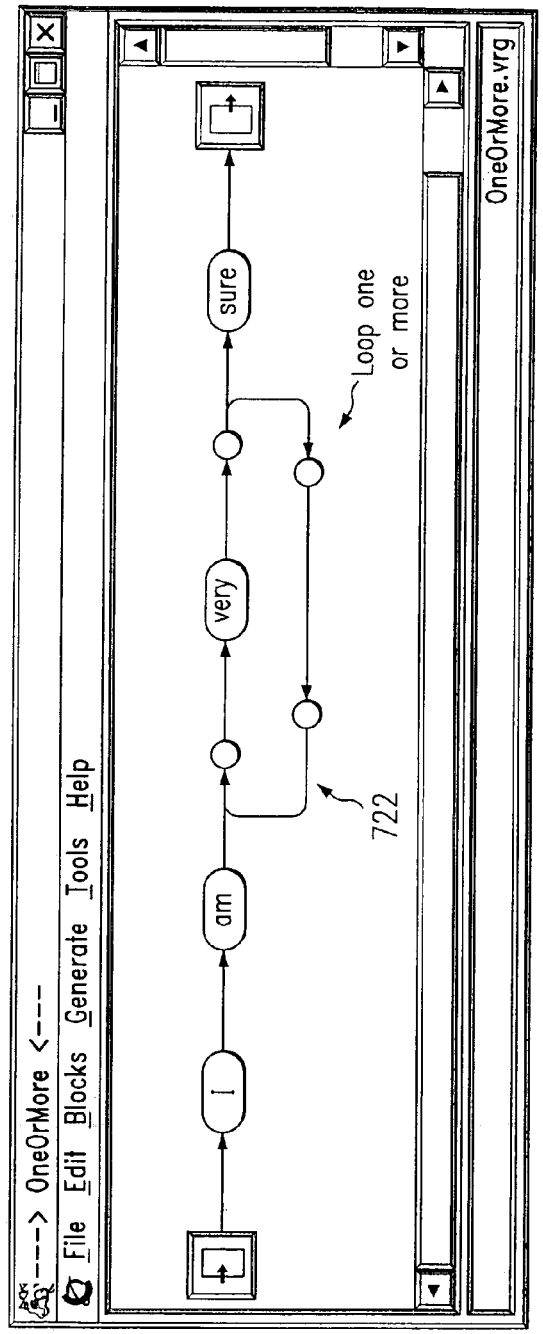
FIGS. 7D and 7E illustrate the use of loops in a grammar created using the SRG tool of FIG. 1.
Figure 7E:
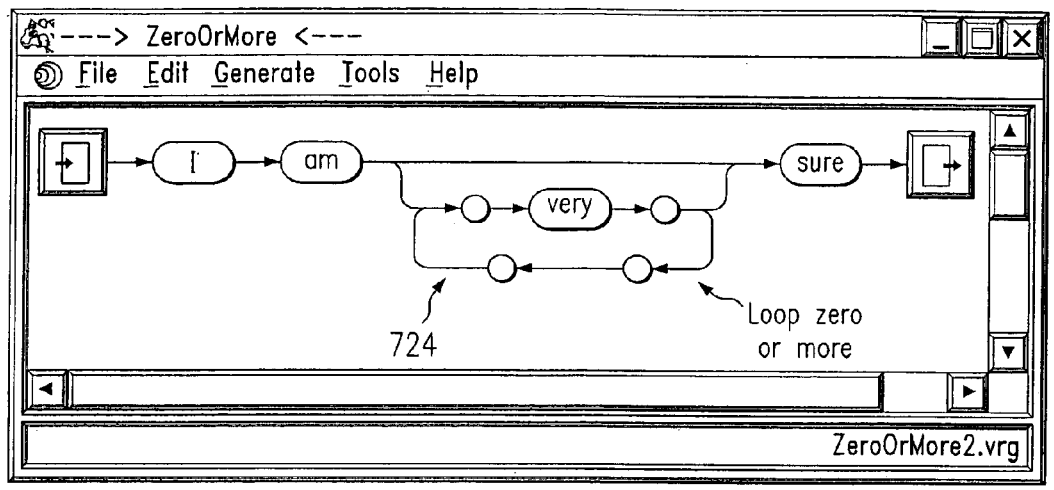

FIGS. 7D and 7E illustrate one use of loops 722, 724, respectively. A loop can be included in a phrase so that a word or words can be used more than one time in succession. The looped word can be used an infinite number of times or, in some instances, omitted completely. In the example shown in FIG. 7D, the looped word "very" must be used at least once, but may be used any number of times in the phrase. In the example shown in FIG. 7E, the word "very" may be used zero or more times. In this example, the word "very" is similar to an optional word, in that it does not need to be spoken at all for the phrase to be recognized.

Figure 7F:
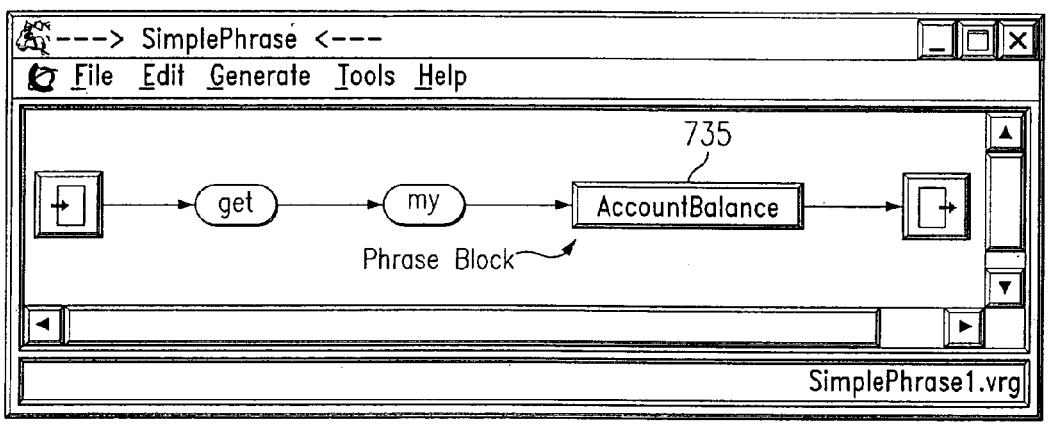
FIGS. 7F and 7G illustrate the use of phrases in a grammar created using the SRG tool of FIG. 1.
Figure 7G:
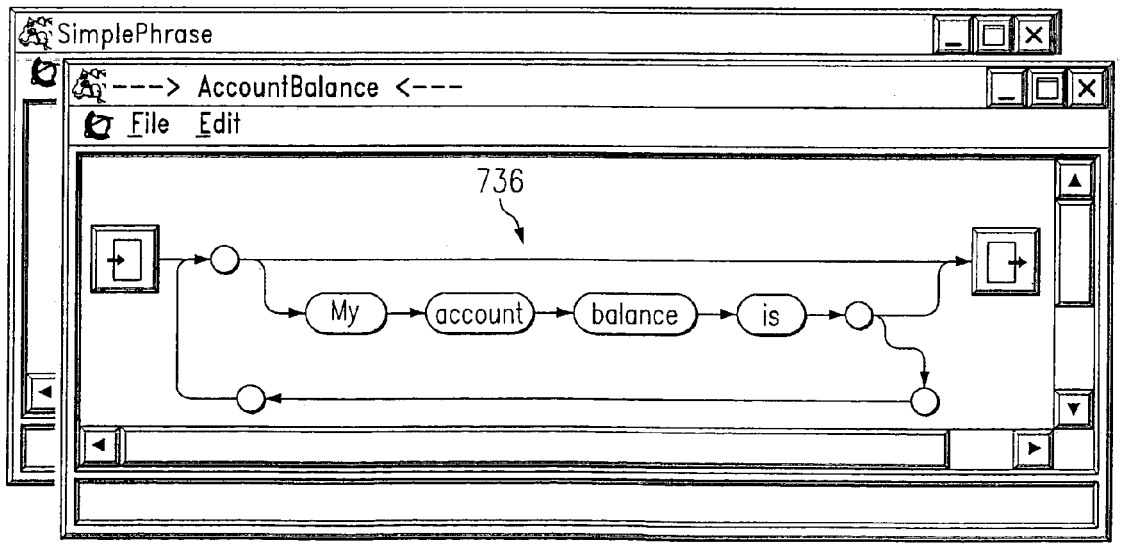

FIG. 7F illustrates a simple phrase block 735 labeled "AccountBalance." Clicking on the block 735 results in the display of a phrase 736 represented by the block, as illustrated in FIG. 7G.

Figure 7H:
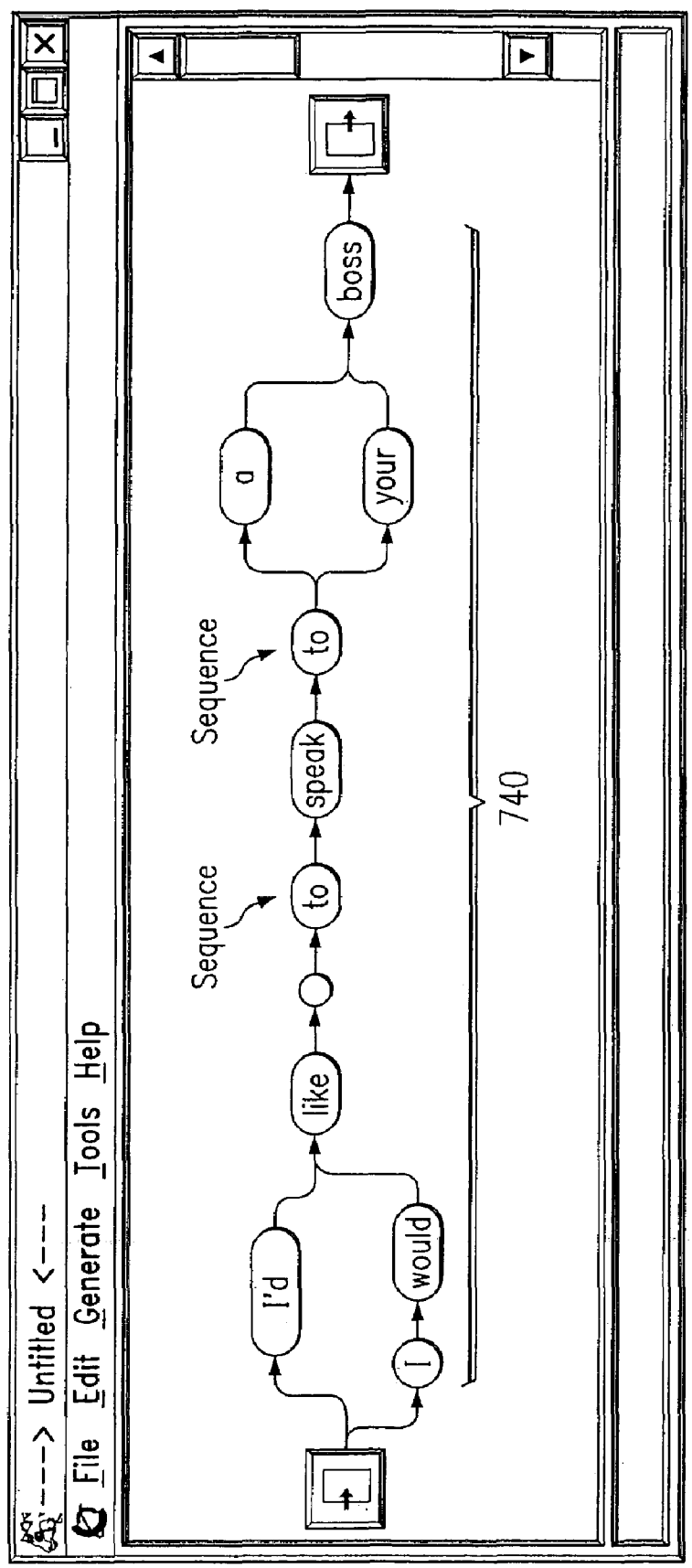
FIG. 7H illustrates a sequence in a grammar created using the SRG tool of FIG. 1.

FIG. 7H illustrates a sequence 740, which is a group of word blocks strung together. In this example, valid responses to the sequence 740 are "I'd like to speak to a boss," "I'd like to speak to your boss," "I would like to speak to a boss," and "I would like to speak to your boss."

Blocks can be added to the Construction Area 200 in one of a number of methods. For instance, using the Blocks pull-down menu on the Construction Area, the user can select the desired block. This will place the block in the upper left corner of the Construction Area. From here, it can be dragged and dropped to the desired location. In another method, the desired block can be clicked on in the Tool Kit 202. Again, this will place the block in the upper left corner of the Construction Area, from where it can be dragged and dropped to the desired location. In yet another example, the desired block can be dragged and dropped from the Tool Kit 202 to the Construction Area 200, allowing the user immediately to place the block in the desired location.

In the illustrative embodiment, for sentences to be completed, blocks are be connected. This can be accomplished in one of a variety of methods. For instance, after a block is placed in the Construction Area 200, another block can be placed right after it. To connect these blocks, the first block is highlighted by clicking on it once and then the user right-clicks on the block to which it is to be connected. Next, the user selects Connect from the drop down menu. Blocks that are already connected can be disconnected in the same manner by selecting Disconnect from the drop down menu. In another method, after a block is placed in the Construction Area 200, another block can be placed after it. To connect these blocks, the first block is highlighted by clicking on it once. Using the middle mouse button, the user clicks on the block to which it is to be connected, which will automatically connect the two blocks. Blocks that are already connected can be disconnected in the same manner. In yet another method, after a block is placed in the Construction Area 200, the user highlights it by clicking on it once. Another block is added in any of the three manners described above. Using the pull-down menu or clicking on the corresponding button on the Tool Kit 202 will place the new block immediately after the existing block. Dragging and dropping a block will enable the user to place the block in any desired location. To disconnect the added block, the original block is highlighted by clicking on it once, at which point right-clicking on the connected block and selecting Disconnect from the menu results in the blocks being disconnected.

Figure 8A:
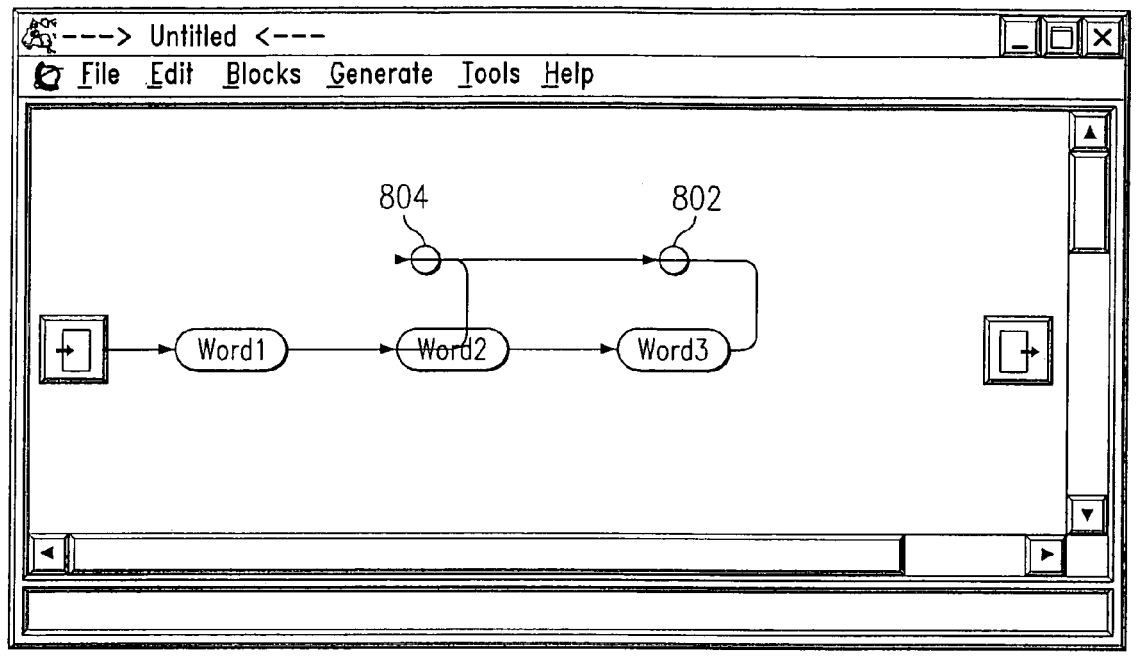
FIGS. 8A–8F illustrate the constraining of connections in a grammar created using the SRG tool of FIG. 1.
Figure 8B:
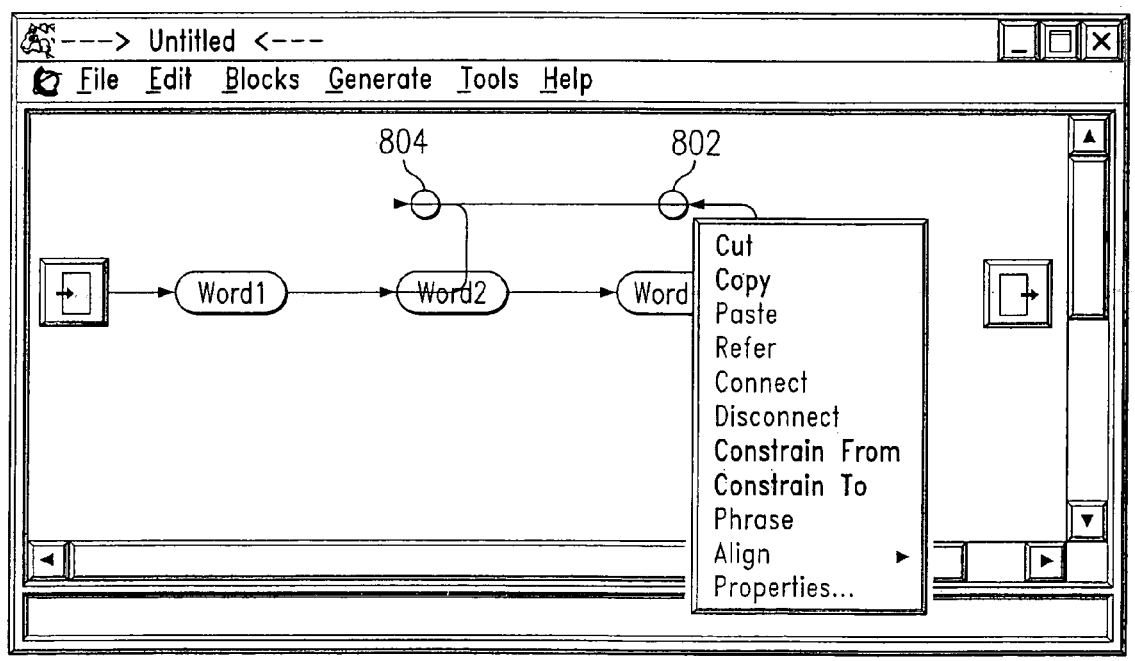
Figure 8C:
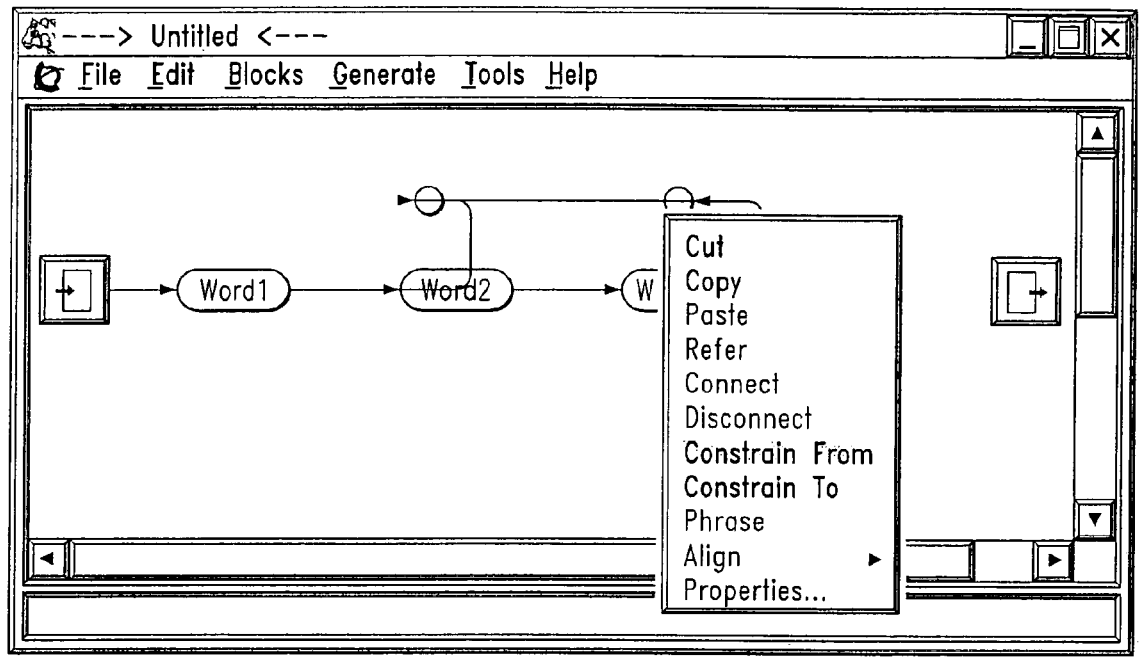
Figure 8D:
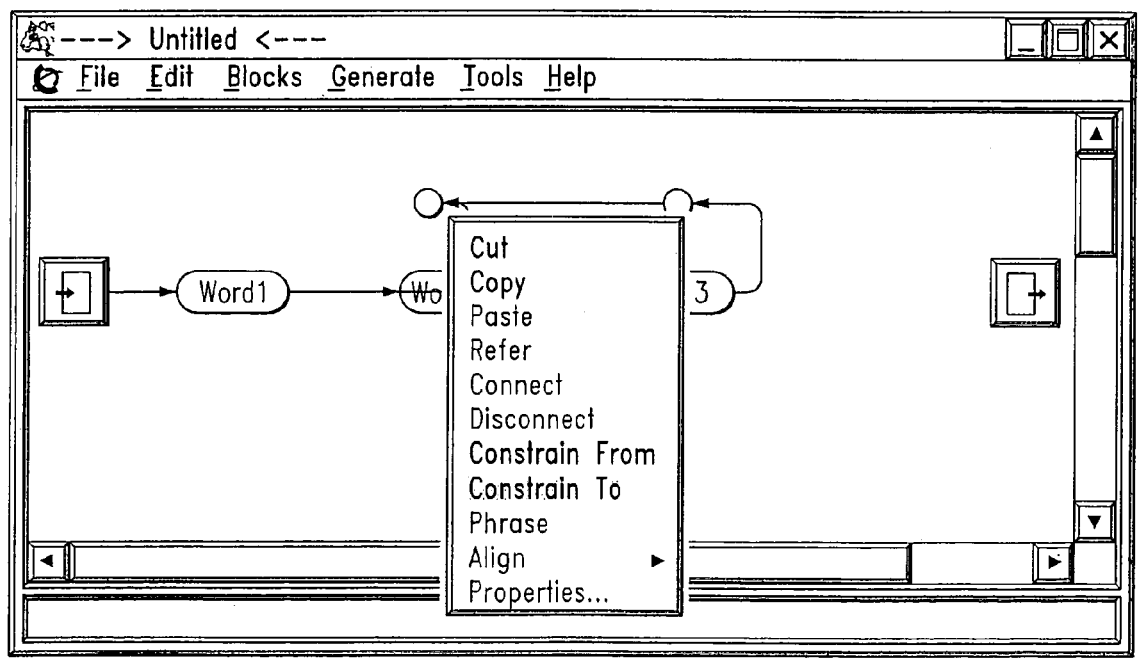
Figure 8E:
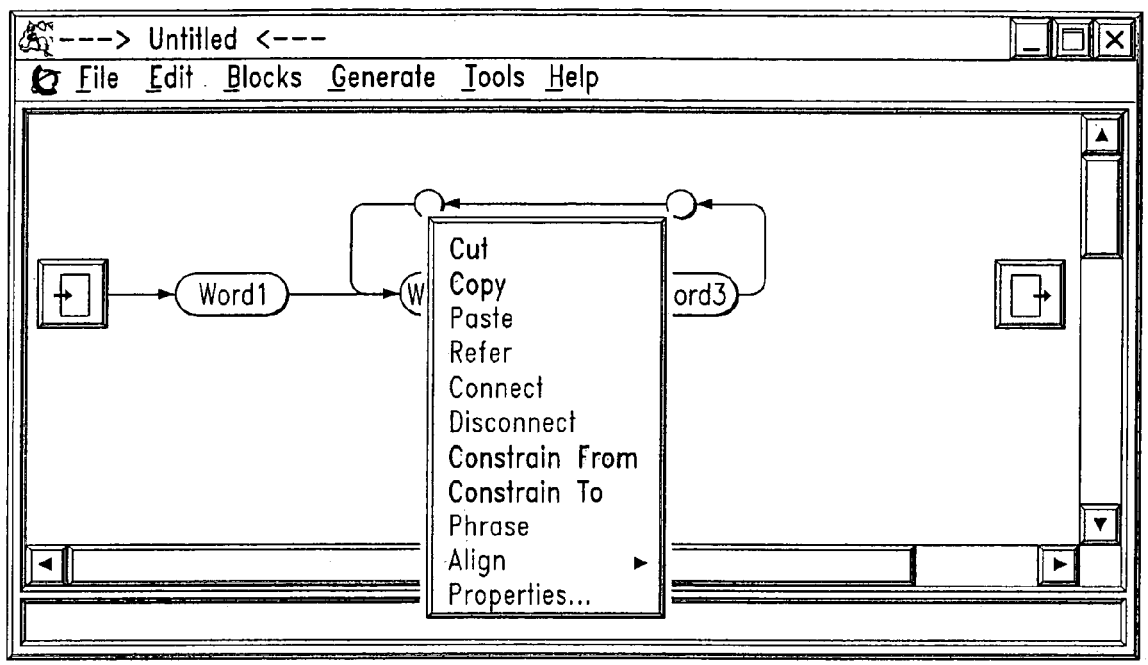
Figure 8F:
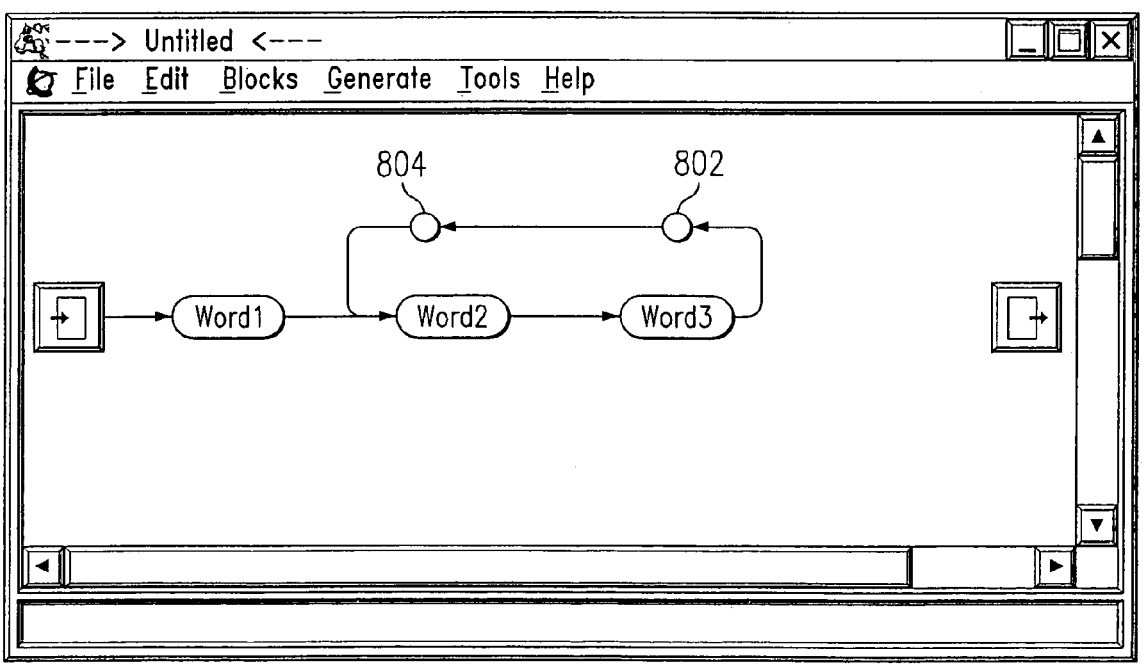

Blocks can be connected form specific sides, if the user so chooses. This can be useful when designing loops or alternatives to keep the Construction Area 200 orderly. The SRG tool 114 builds phrases from left to right within the Construction Area 200. When a loop is introduced, the flow is typically run from right to left before continuing. Constraining "from" and "to" specific points of the blocks can accomplish this. To constrain from or to a specific side of a block (i.e., top, bottom, left, or right), the user right-clicks on that edge of the block. From the menu, the user then selects "Constrain To" or "Constrain From". FIG. 8A illustrates an example in which connector blocks 802, 804, have not been constrained to or from. FIGS. 8B–8E illustrate the sequence of steps taken to properly constrain the connector blocks. First, to constrain to the right side of the connector block 802, the user right clicks on the right edge of the block 802 and selects "Constrain To" from the menu (FIG. 8B). To constrain from the left side of the connector block 802, the user right clicks on the left edge of the block 802 and selects "Constrain From" from the menu (FIG. 8C). To constrain to the right side of the connector block 804, the user the user right clicks on the right edge of the block 804 and selects "Constrain To" from the menu (FIG. 8D). To constrain from the left side of the connector block 804, the user right clicks on the left edge of the block 804 and selects "Constrain From" from the menu (FIG. 8E). FIG. 8F illustrates the phrase after the connector blocks 802, 804 have been properly constrained.

Figure 9A:
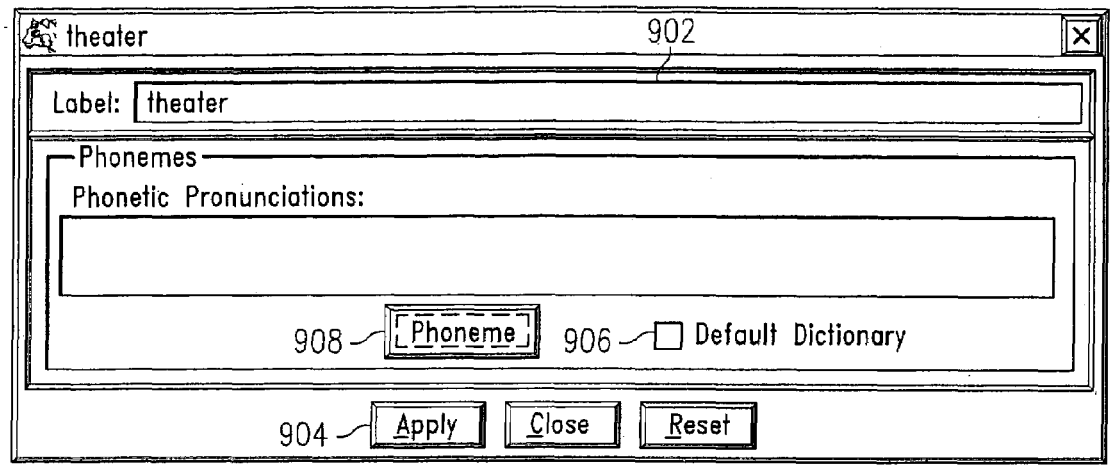
FIGS. 9A–9F illustrate the definition of alternative pronunciations of a word included in a grammar created using the SRG tool of FIG. 1.
Figure 9B:
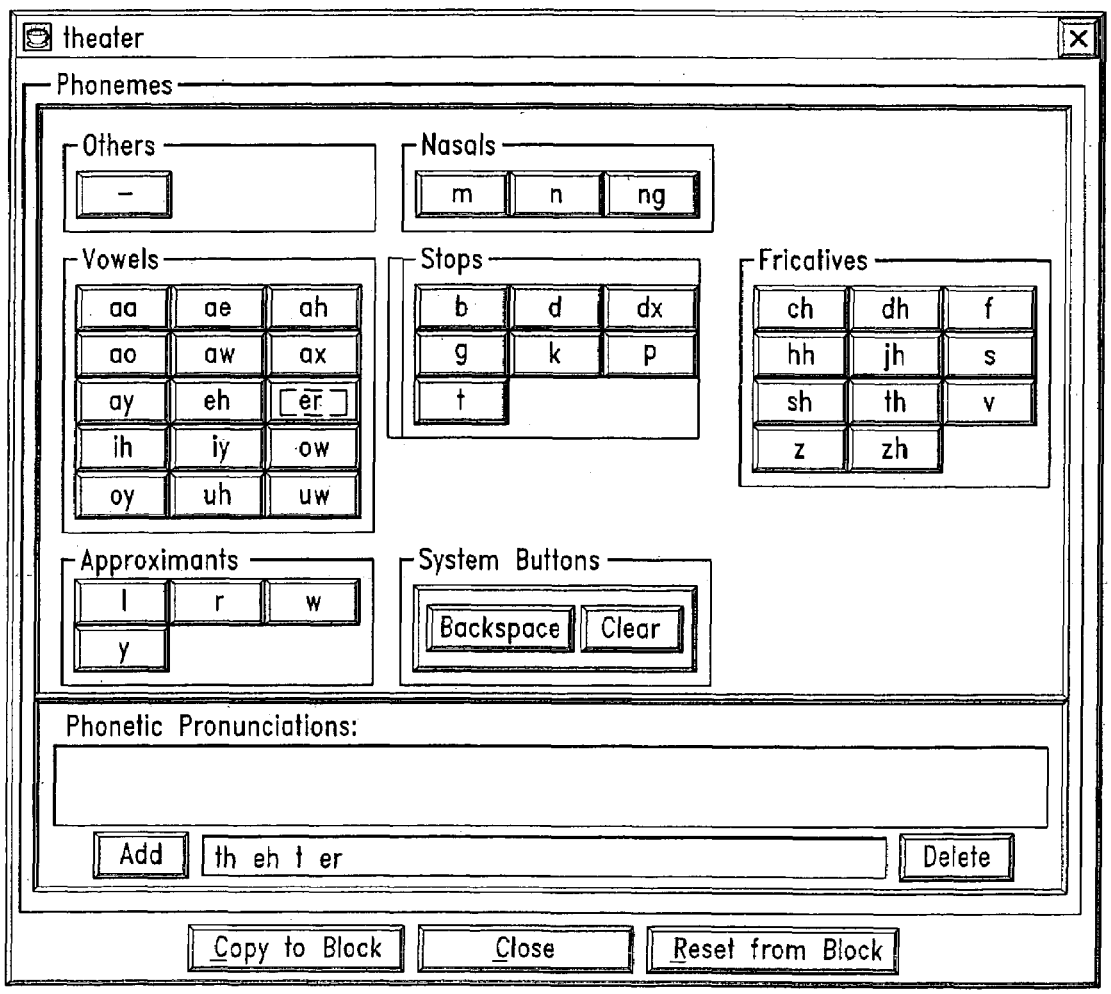
Figure 9C:
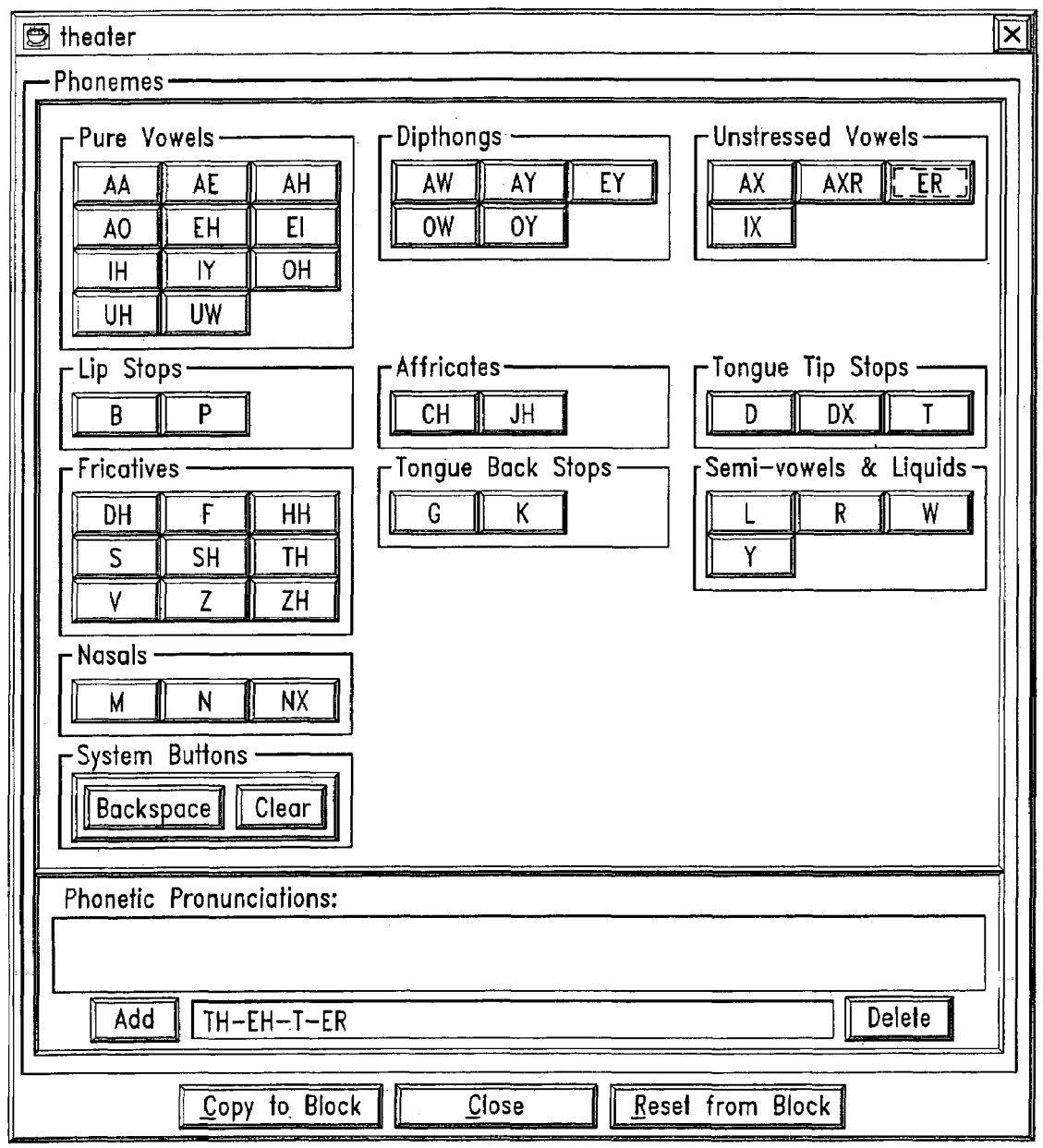
Figure 9D:
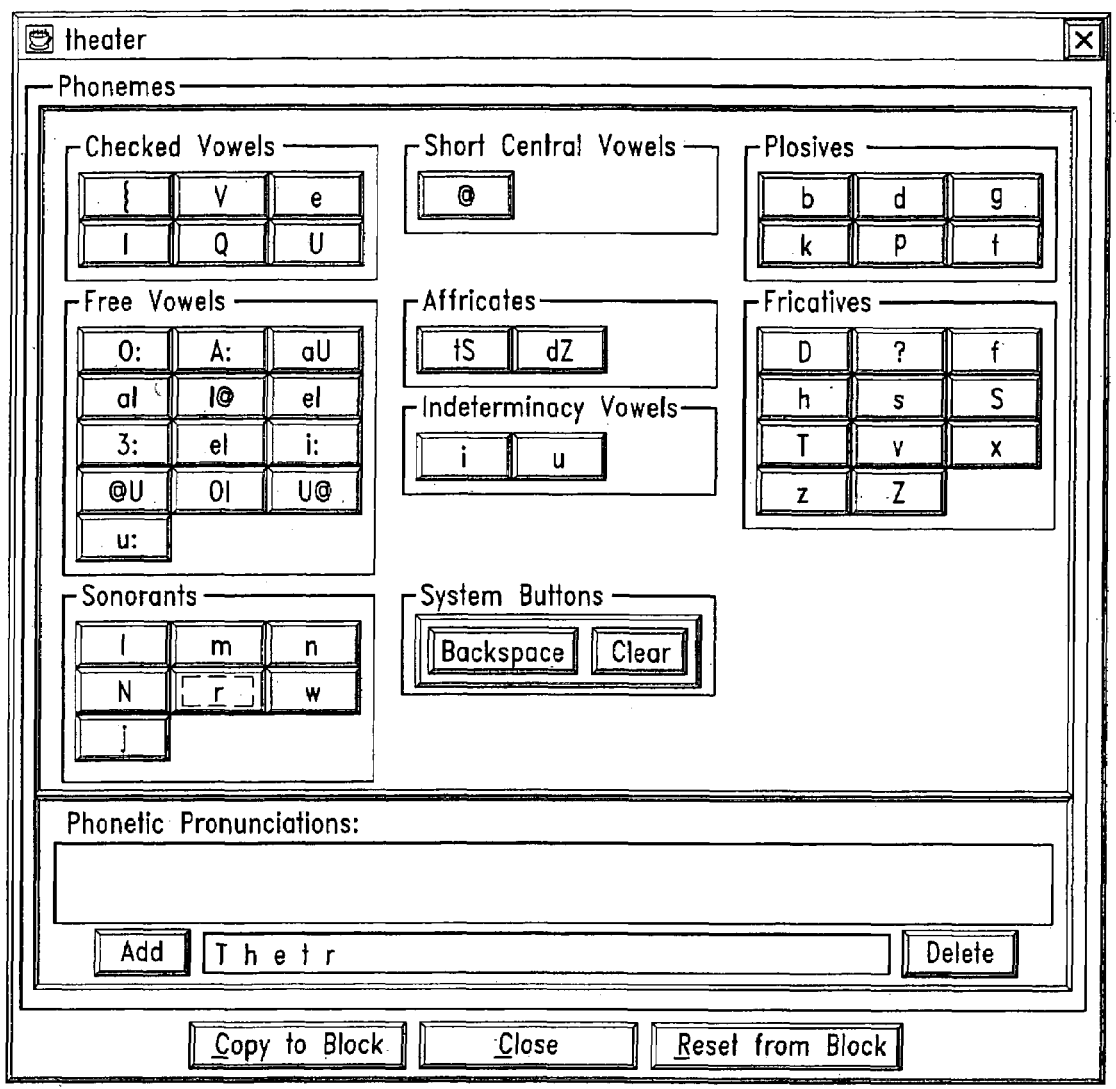
Figure 9E:
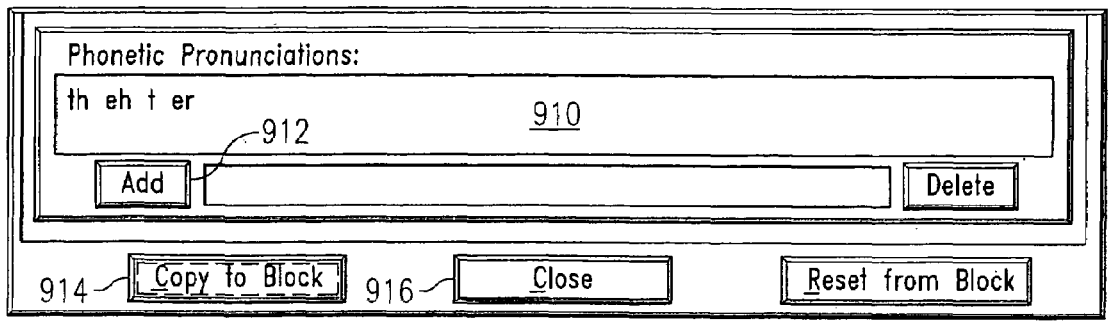
Figure 9F:
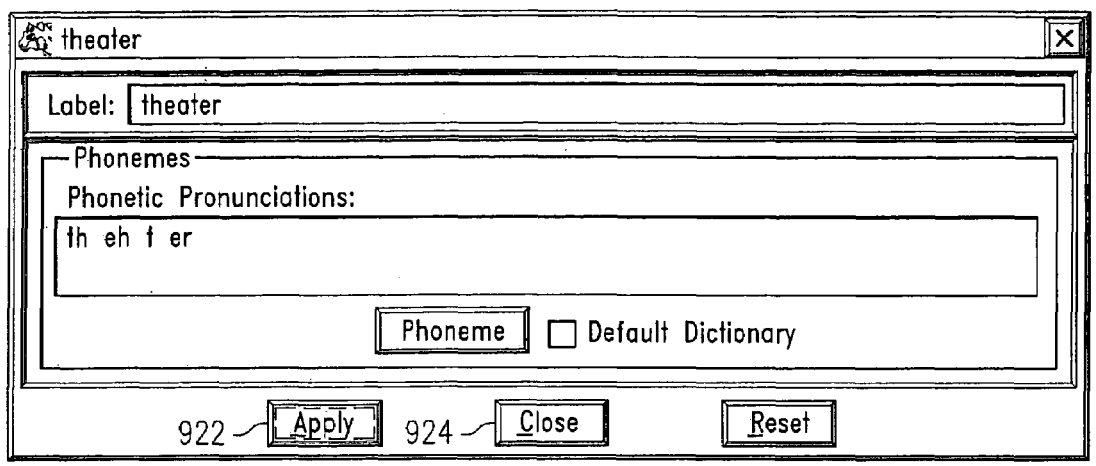

As previously indicated, a word block is a block that represents a single word within a phrase. Once placed, the block can be labeled and defined. Alternative pronunciations of a word can be defined as follows. Using the default dictionary, words will be defined by the vendor. Non-vendor words/terms can be defined phonetically for speech recognition purposes as follows. Using either the pull-down menu or the Tool Kit 202, a word block is added to the Construction Area 200. The user then double-clicks on the word block to open it. This results in the display of a word dialog box 900 (FIG. 9A). In a Label field 902 of the word dialog box 900, the user types the word to be recognized and then clicks on an Apply button 904. Unchecking a checkbox 906 labeled "Default Dictionary" and then clicking on a Phoneme button 908 results in the display of a list of vendor-specific phonemes, with which the user phonetically spells the word being defined. FIGS. 9B–9D respectively illustrate three different sets of vendor-specific phonemes. Once the word has been spelled phonetically in a field 910 (FIG. 9E), the user clicks on an Add button 912, then a Copy to Block button 914, then a Close button 916. This results in the display of a dialog box 920 illustrated in FIG. 9E. Using this dialog box 920, the user clicks on an Apply button 922 and then a Close button 924.

It should be noted that most words are already defined in the SRG tool's or the vendor's dictionary. Words that need to be defined typically include, for example, proper names, company names, products, and the like. Such words may be phonetically spelled as the user would speak them. Several phonetic spellings can be made for a single word to account for differing accents or intonations of callers.

Figure 10A:
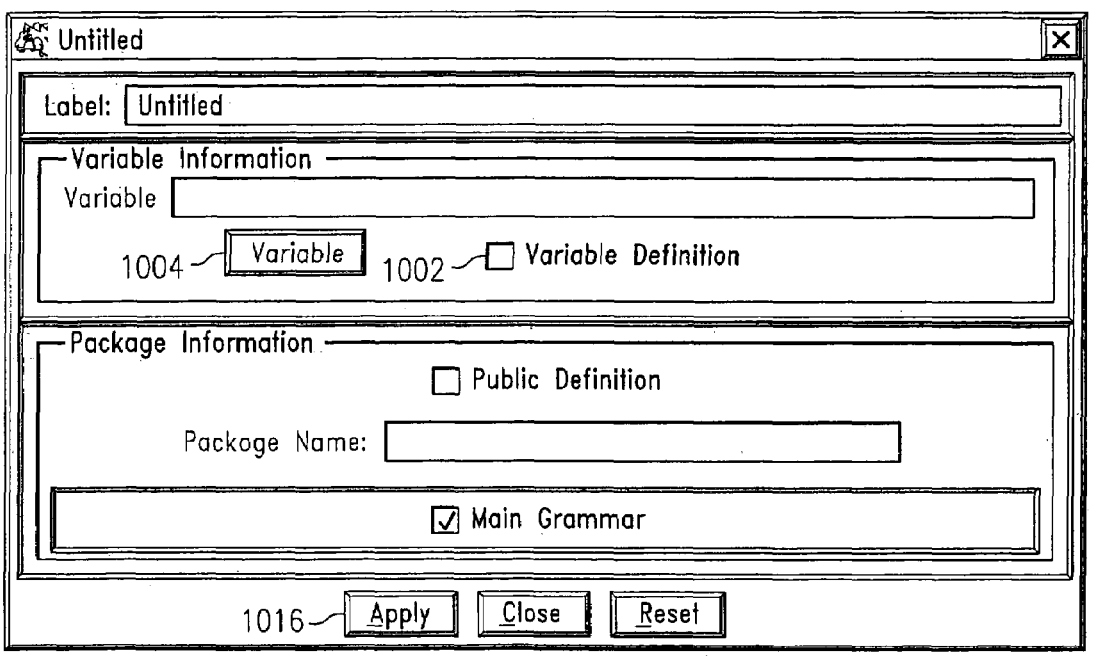
FIGS. 10A and 10B illustrate the definition of a variable included in a grammar created using the SRG tool of FIG. 1.
Figure 10B:
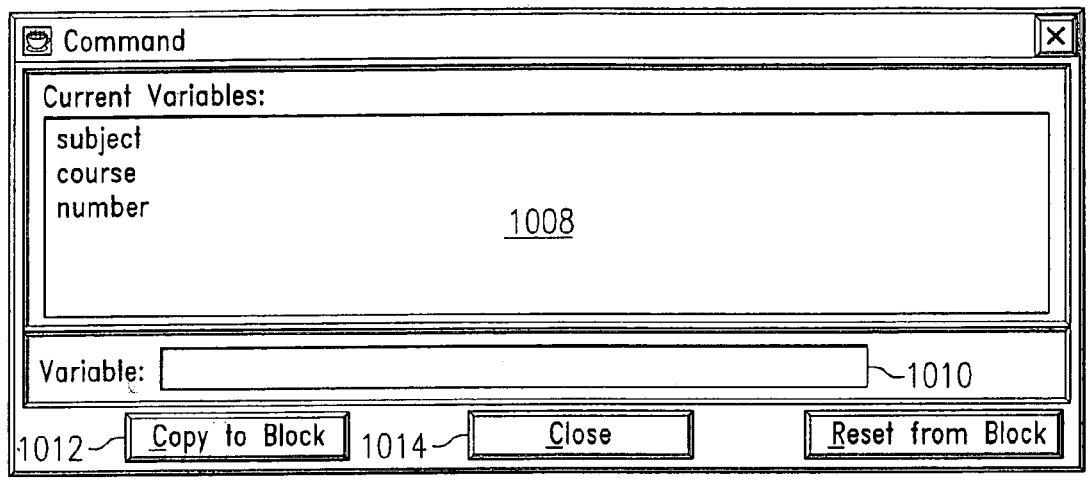

Properties can be assigned to a phrase block in a manner similar to that of assigning properties to a word block, for example, by choosing the Properties menu pick from the Edit pull-down menu or by clicking the phrase block (to highlight it) and then right-clicking and choosing properties. Choosing Properties after right-clicking on the phrase block results in the display of a dialog box 1000 (FIG. 10A). To enter a variable, the user checks a checkbox 1002 designated "Variable Definition." This activates a Variable button 1004. Clicking on the Variable button 1004 results in the display of a list 1008 of all currently defined variables (FIG. 10B). The Variable Definition option may not be supported by all vendors. Inside the phrase block, a value can be returned that will be assigned to the variable. This variable will be passed to the grammar for processing. If there are variables defined in other blocks, they will be included in the list 1008. A variable from the list 1008 can be selected or a variable name typed in a field 1010. Clicking a Copy to Block button 1012 copies the variable name to the phrase block, at which point, a Close button 1014 is clicked. At that point, an Apply button 1016 (FIG. 10A) is clicked.

Figure 11A:
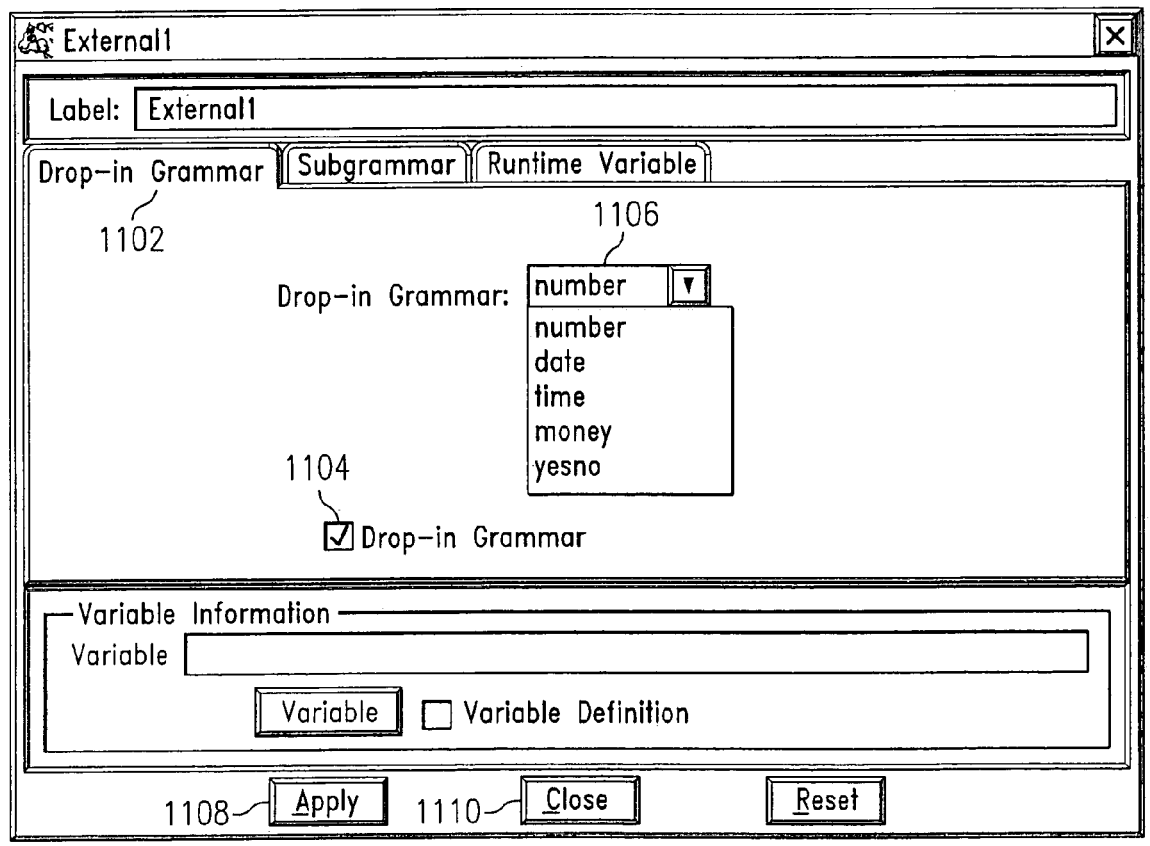
FIGS. 11A–11C illustrate use of Drop-In Grammars, Subgrammars, and Runtime Variables in connection with the SRG tool of FIG. 1.
Figure 11B:
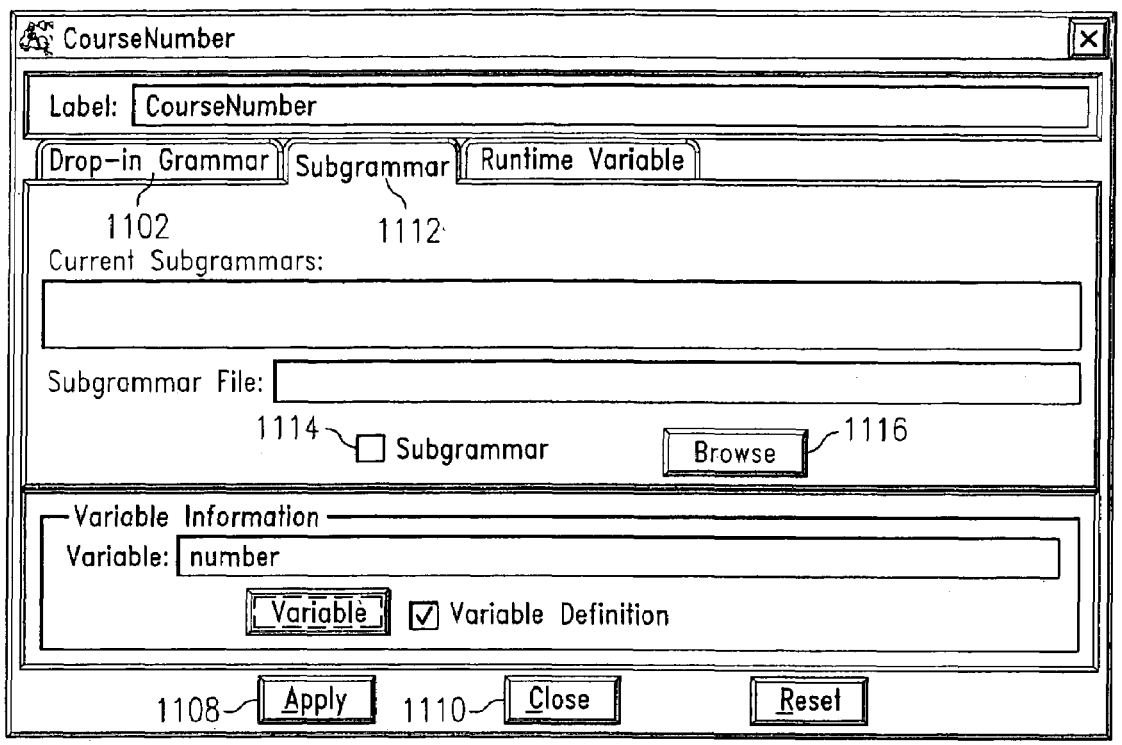
Figure 11C:
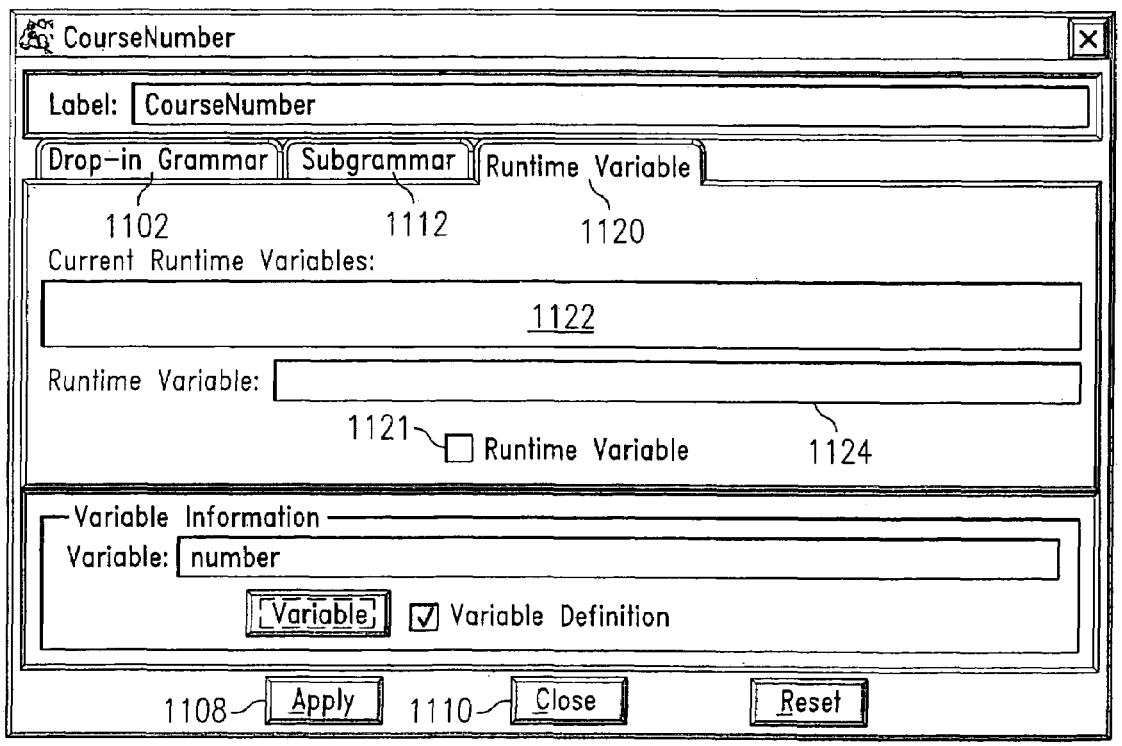

An external block may allow grammars defined outside of the SRG tool 114 to be included in the current grammar. External blocks include Drop-In Grammars, Subgrammars, and Runtime Variables, each of which will be described in greater detail below. Opening an external block results in the display of a dialog box 1100, as illustrated in FIGS. 11A–11C.

A Drop-In Grammar may be predefined by the vendor; therefore, the pull-down list displayed will be specific to the current vendor. Only certain vendors have Drop-In Grammar capabilities. An exemplary pull-down list is illustrated in FIG. 11A. Typically, the list consists of numbers, dates, times, dollar amounts, and yes/no. To implement a Drop-In Grammar, an the user double-clicks on an external block in the grammar shown in Construction Area 200, selects a Drop In Grammar tab 1102, checks a checkbox 1104 designated "Drop-In Grammar". This will highlight a Drop-In Grammar field 1106, displaying a drop-down menu. At that point, the user selects an item from the drop-down menu, clicks an Apply button 1108, and then a Close button 1110.

A Subgrammar may be defined externally, typically by the vendor, to be used inside the current grammar. To use a Subgrammar, from the dialog box 1100, the user may select a Subgrammar tab 1112, as illustrated in FIG. 11B, and then checks the checkbox 1114 labeled Subgrammar to choose a subgrammar from the list. If a list is not displayed, clicking on a Browse button 1116 enables the user to choose a Subgrammar from a local file system. Once a Subgrammar is selected, the user clicks the Apply button 1108 and then the Close button 1110. As with Drop-In Grammars, only certain vendors support Subgrammars.

A Runtime Variable is a placeholder that dynamically changes the grammar. At runtime, acceptable responses may be inserted into the grammar and are then used in place of the Runtime Variable. These responses may be inserted and deleted based on the user's requirements. For example, at the beginning of a phone call (or upon acquiring the recognition resource), the responses are stored in a placeholder. At the end of the phone call (or freeing of the recognition resource), the responses are removed. The user inserts a Runtime Variable into the application (e.g., "dial Mom"). Speech recognition is accomplished using a vocabulary application. For example, if there are two phone numbers for "Mom" in the application for two different users, the application will, by voice intonation, be able to determine which "Mom" to insert into the grammar. To use a Runtime Variable, the user selects a Runtime Variable tab 1120 from the dialog box 1100, as illustrated in FIG. 11C, and then checks a checkbox 1121 labeled Runtime Variable, to choose a current Runtime Variable from a list displayed in a field 1122. If a list is not displayed, a new Runtime Variable must be entered in a Runtime Variable field 1124. Once a Runtime Variable is selected from the list, the user clicks the Apply button 1108 and then the Close button 1110.

Figure 12A:
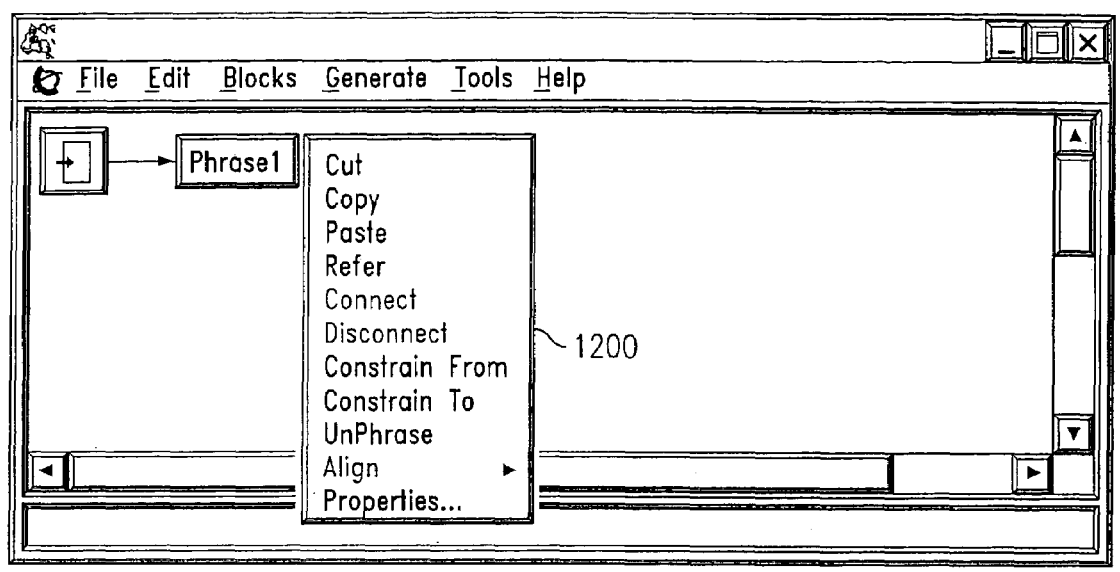
FIGS. 12A–12C illustrate creation of a reference block for use in a grammar created using the SRG tool of FIG. 1.
Figure 12B:
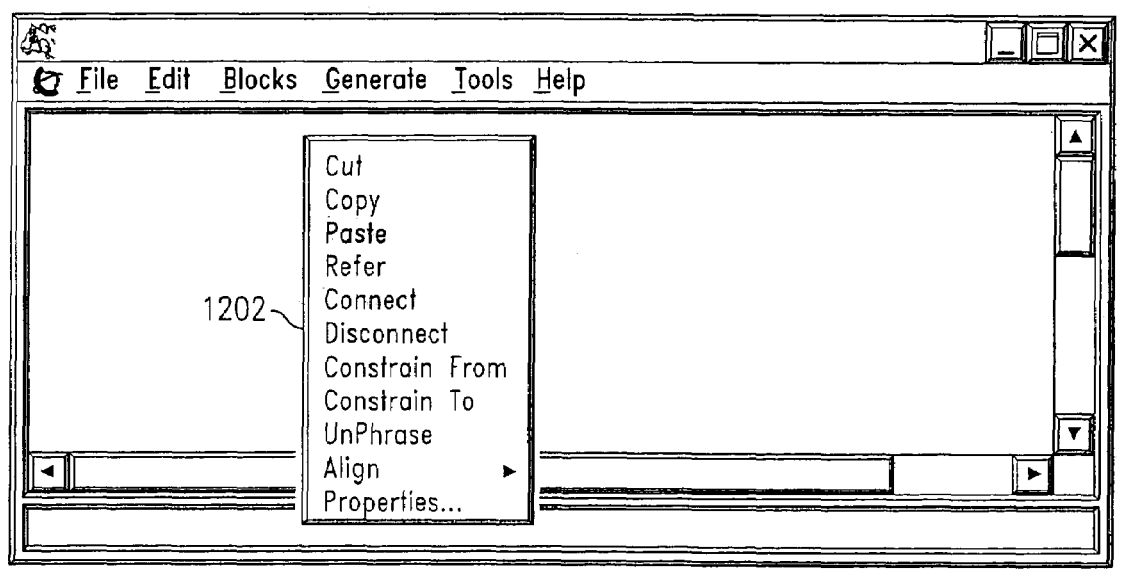
Figure 12C:
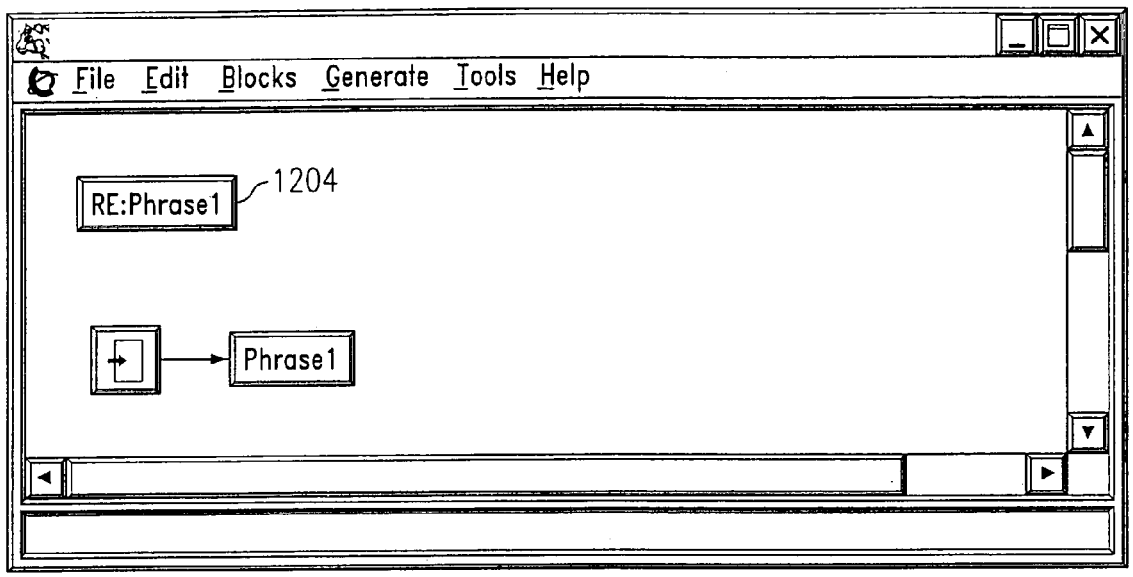

A reference block executes an existing phrase block and may enable a phrase block to be used multiple times, having been defined only once. To use a reference block, after the phrase block to be referenced has been added to the grammar, the user right-clicks on the phrase block to display a menu 1200 (FIG. 12A). The user selects a Refer menu pick from the menu 1200. In either the same or a new Construction Area, the user may right-click to open a new menu 1202 (FIG. 12B) and clicks on a Paste menu pick, which results in a reference block 1204 (FIG. 12C) being pasted in the Construction Area. The reference block 1204 may be "Pasted" as many times as required. Reference blocks can be labeled and have a variable assigned to them, as illustrated above.

A connector block typically connects two other blocks. Double-clicking on a connector block in the grammar enables a user to add path information. After path information has been added, the connector block may turn a different color, such as yellow. The type of path information that can be added is vendor-dependent. For example, using Nuance, a path can contain a return value or a parameter. When returned, the value may then be inserted into a variable defined for the current phrase. A parameter is a defined slot ("NL Slot"/"NL Return") value that is returned to the grammar with the desired value. NL Slots and NL Returns are created in the grammar, which in turn can be included in a folder and sent to another application. NL Slots and NL Returns allow the grammar and the application to communicate.

For example, assume a caller is presented with two options from which to choose, such as "Checking Account Balance" and "Savings Account Balance." Assume further that the caller selects Savings Account Balance and the value is stored as a variable in a slot. The recognizer returns this value to any application that uses the grammar. The SRG tool 114 ensures only valid syntax for Slot and Return values by enabling/disabling fields based on the current value.

Figure 13A:
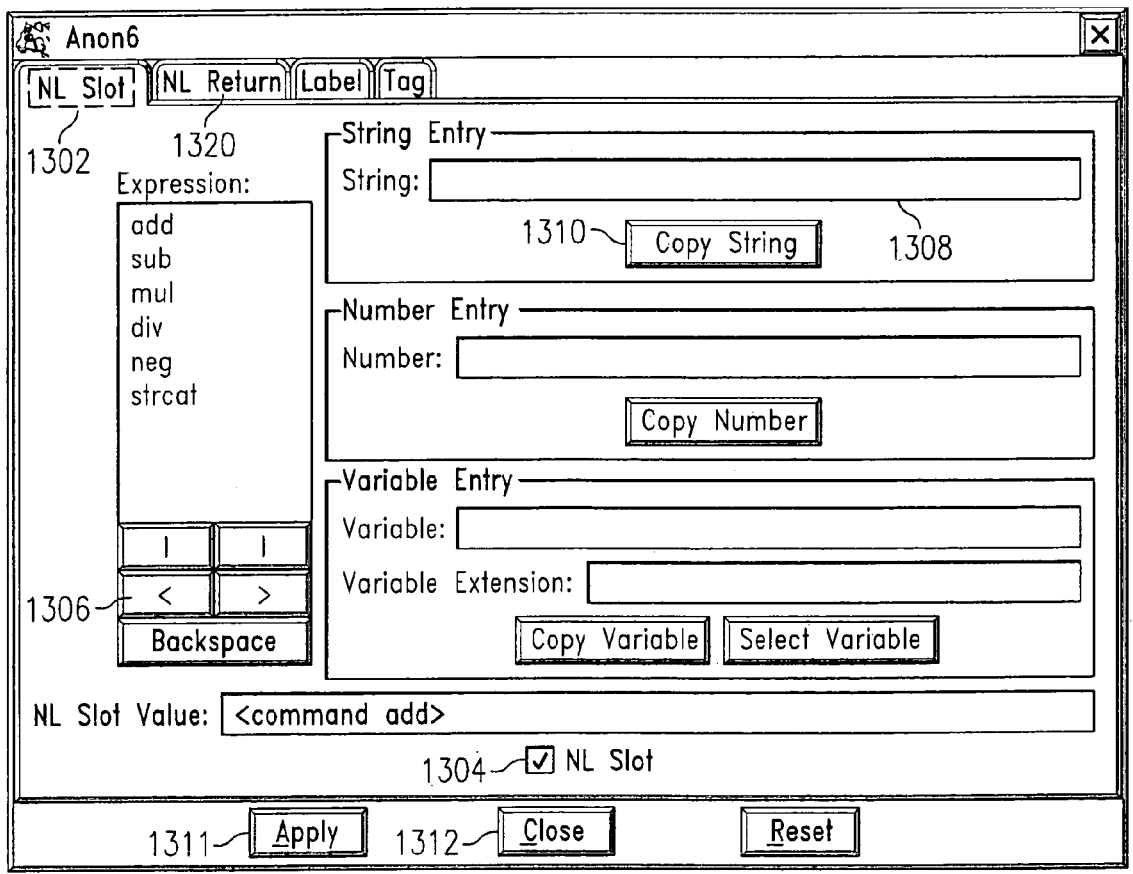
FIGS. 13A–13D illustrate the addition of path information using connector blocks in a grammar created using the SRG tool of FIG. 1.
Figure 13B:
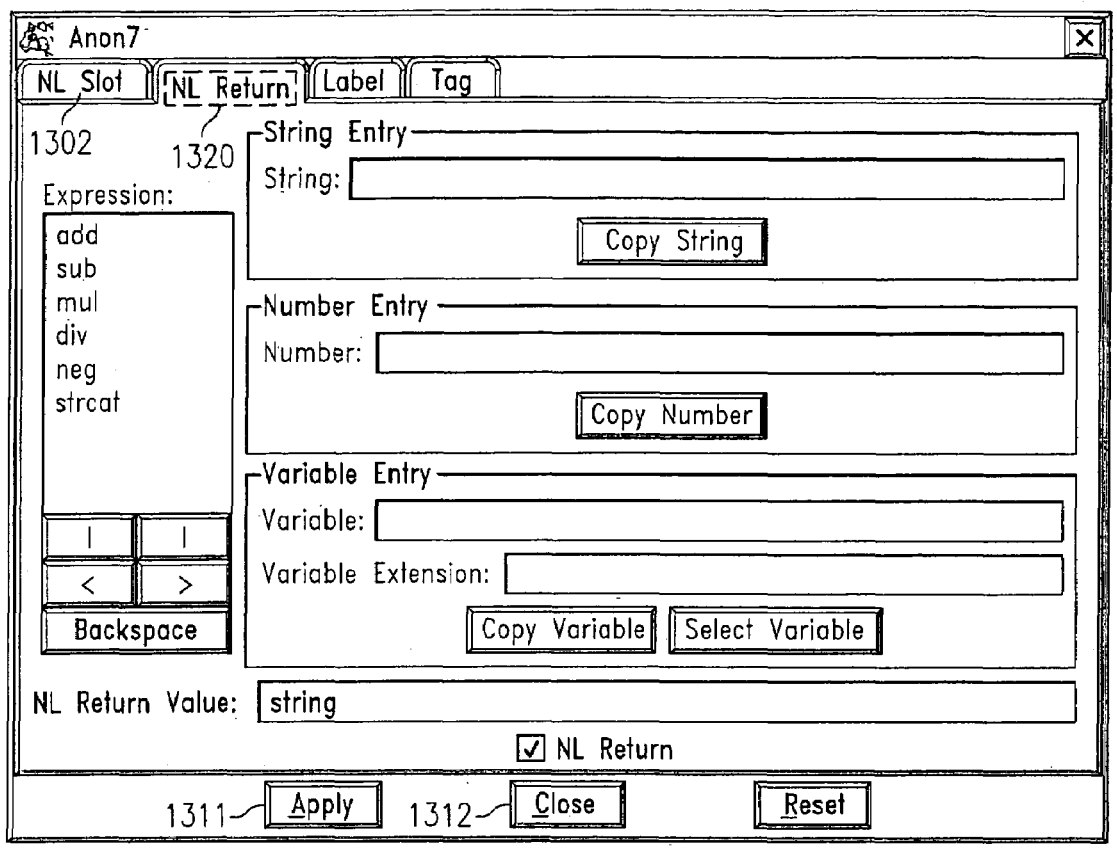
Figure 13C:
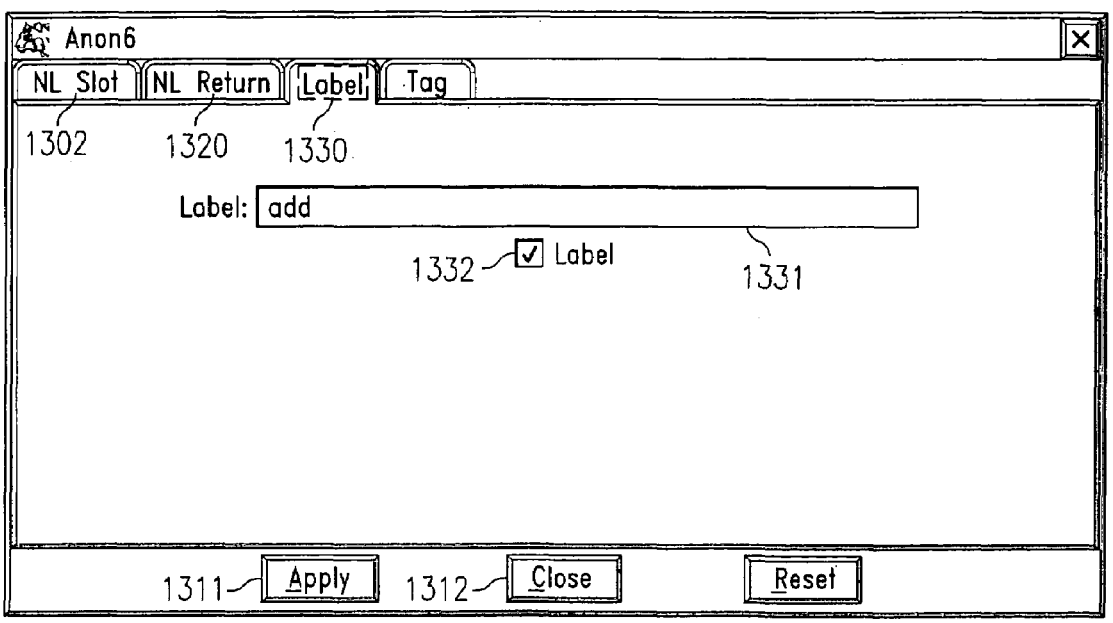
Figure 13D:
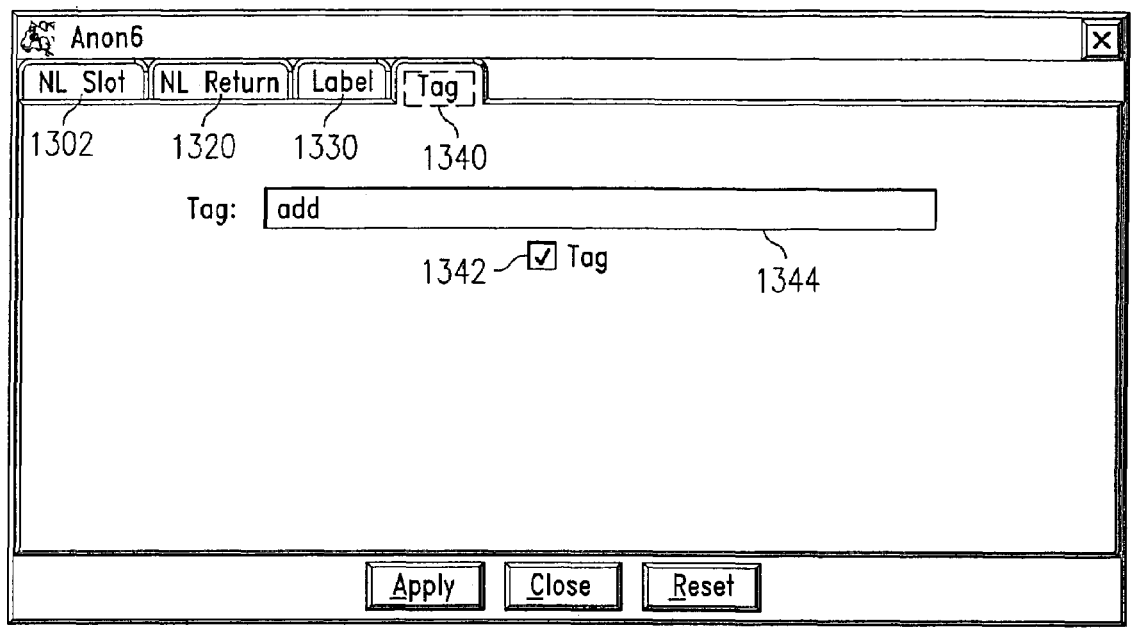

To add path information for an NL Slot, the user may want to first ensure that NUANCE is selected in the Grammar tab 502 of the Global Properties dialog box 500 (FIG. 5A). Next, the user may add a connector block to the current grammar and double-clicks thereon to display a dialog box 1300, at which point, the user selects an NL Slot tab 1302 thereof (FIG. 13A). Next, the user checks a checkbox 1304 labeled NL Slot. The user then clicks a button 1306 labeled <, types a value in a String Entry field 1308, clicks a Copy String button 1310, then clicks an Apply button 1311 and then a Close button 1312. Addition of path information for an NL Return is accomplished in a similar fashion using an NL Return tab 1320 of the dialog box 1300 (FIG. 13B).

For some vendor's systems, such as BBN, a Label may be defined for a path. A Label may allow the user selectively to enable/disable parts of the grammar in the application. For example, there is a list from which to choose that includes "add a course," "drop a course," and "list courses." For a new student, it would be desirable to disable the "drop" and "list" options and only allow the student to "add". To add path information using a Label, the user first ensures that BBN is selected using the Grammar tab 502 of the Global Properties dialog box 500 (FIG. 5A). At this point, the user adds a connector block to the grammar and double-clicks on the block. The user then selects a Label tab 1330 of the dialog box 1300 (FIG. 13C) and checks a checkbox 1332 labeled Label to enable a field 1334 labeled Label. The label name is then entered in the Label field 1334, at which point, the Apply and Close buttons 1311, 1312, are clicked.

When using some vendor's speech recognition systems, such as BBN, JSGF, and Philips, a Tag may be defined for a path. A Tag is the value returned, with the recognized grammar, as a valid response. A Tag is similar to a Slot, in that it acts as a placeholder. To add path information using a Tag, the user first ensures that the appropriate vendor is selected in the Grammars tab 502 of the Global Properties dialog box 500 (FIG. 5A) and then double-clicks on a connector block in the Construction Area to select it. Next, the user may select a Tag tab 1340 of the dialog box 1300 (FIG. 13D) and checks a checkbox 1342 labeled Tag to enable a field 1344 labeled Tag. The tag name is then entered in the Tag field 1344, at which point, the Apply and Close buttons are clicked.

Figure 14:
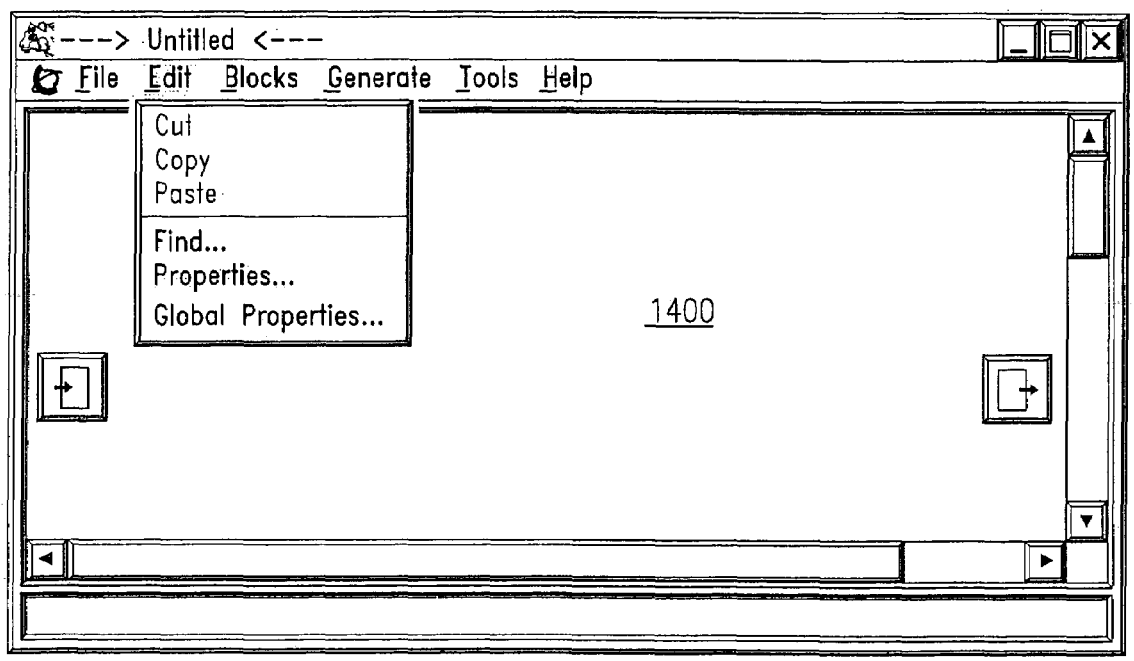
FIGS. 14–14G illustrate creation of a simple grammar using the SRG tool of FIG. 1.
Figure 14A:
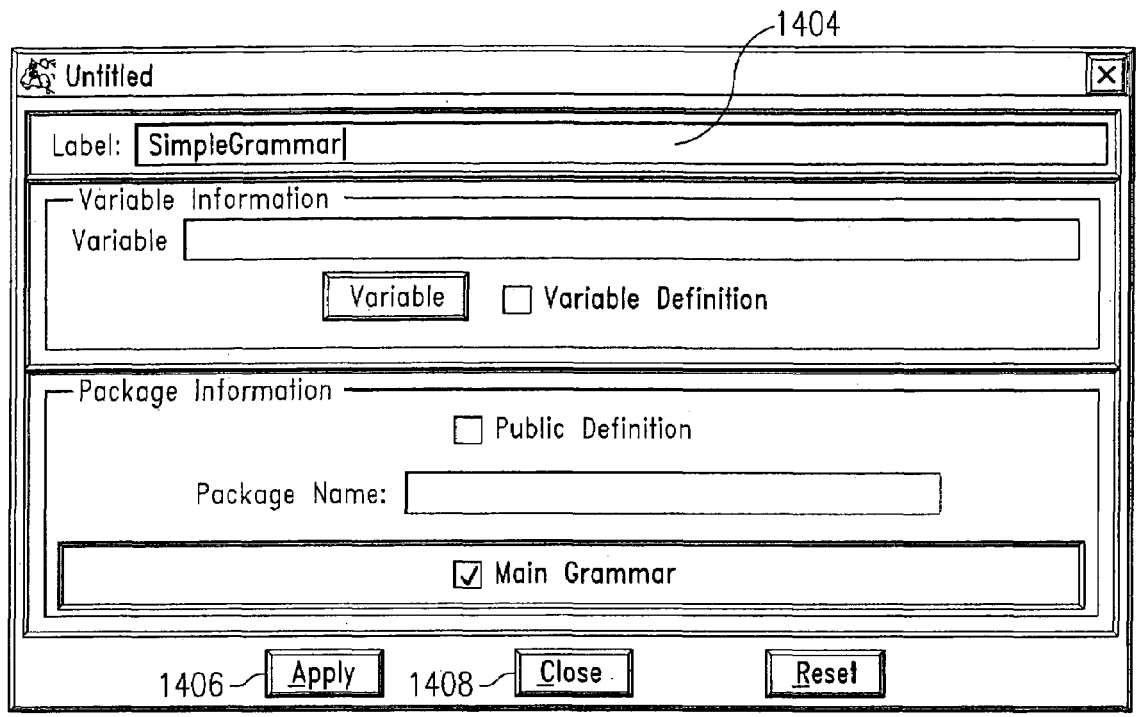
Figure 14B:
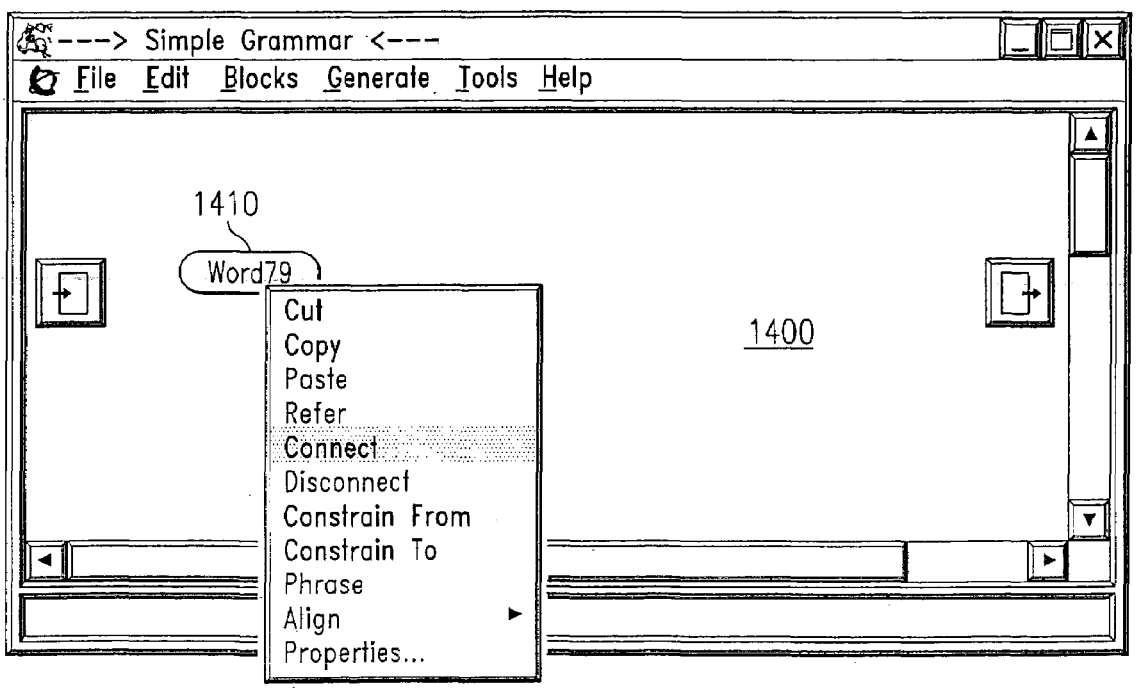
Figure 14C:
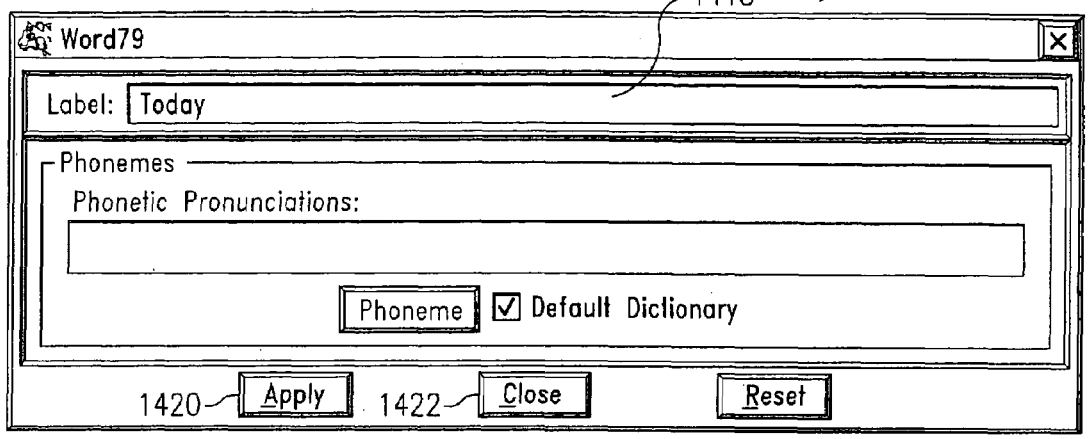
Figure 14D:
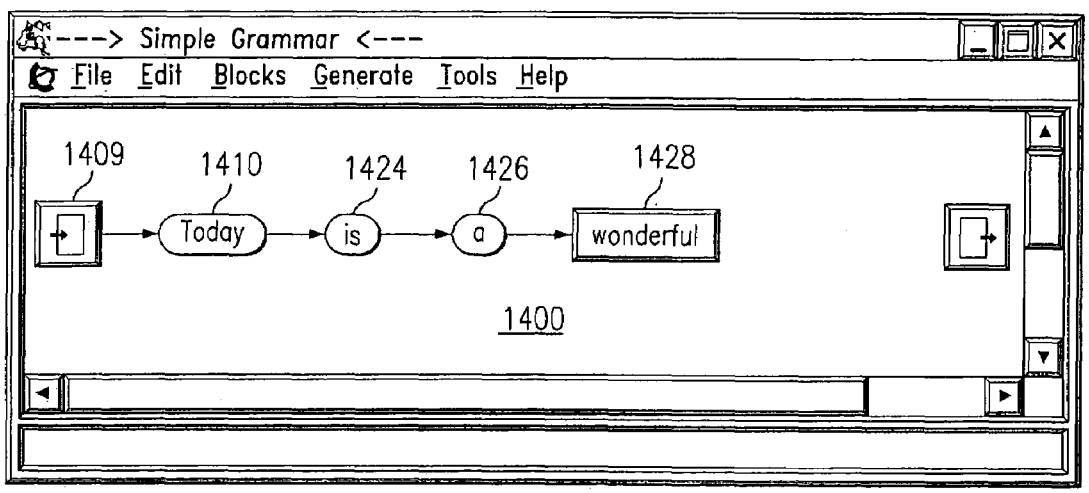

The following section will illustrate the construction of a simple grammar using the SRG tool 114; specifically, the sentence "Today is a wonderful day," with the words "beautiful" and "sunny" being used as alternative for "wonderful," will be described. Referring to FIG. 14, as previously indicated, the user starts the SRG tool 114 to create an empty Construction Area 1400, then clicks on the Edit pull-down menu and selects the Properties menu pick therefrom. This results in the display of a dialog box 1402 (FIG. 14A). The user types "Simple Grammar" in a Label field 1404 and then clicks the Apply button 1406, followed by the Close button 1408. At that point, using either the pull-down Blocks menu or the Word button on the Tool Kit (FIG. 2), the user adds a word block 1410 (FIG. 14B) to the construction area 1400 and connects it to a start block 1409. Double-clicking on the word block 1410 opens its properties dialog box 1415 (FIG. 14C). The word block 1410 is labeled "Today" by typing the word Today in the Label field 1418, at which point, the user clicks the Apply button 1420, and then the Close button 1422. In the same manner, two more word blocks 1424, 1426, respectively labeled "is" and "a" are added to the Construction Area 1400 and connected as illustrated in FIG. 14D as described above.

Figure 14E:
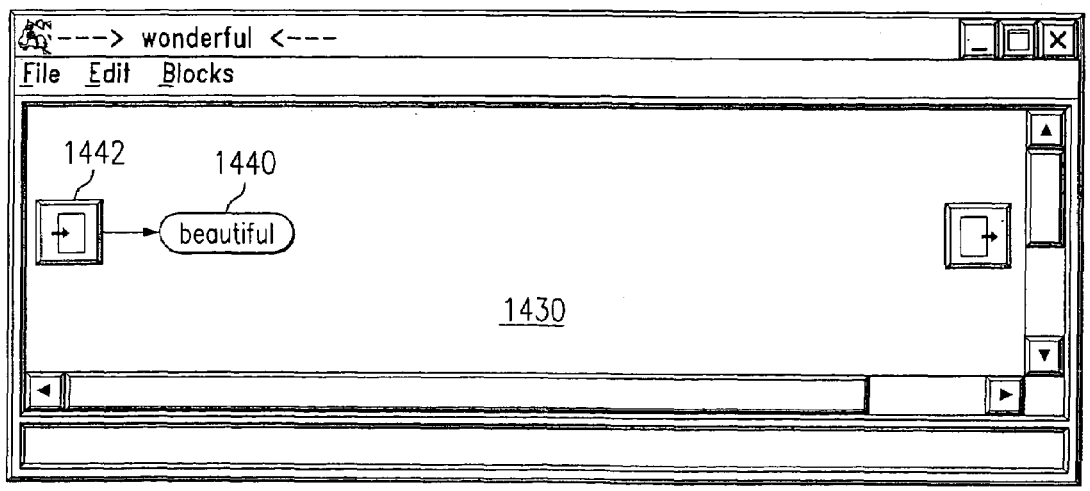
Figure 14F:
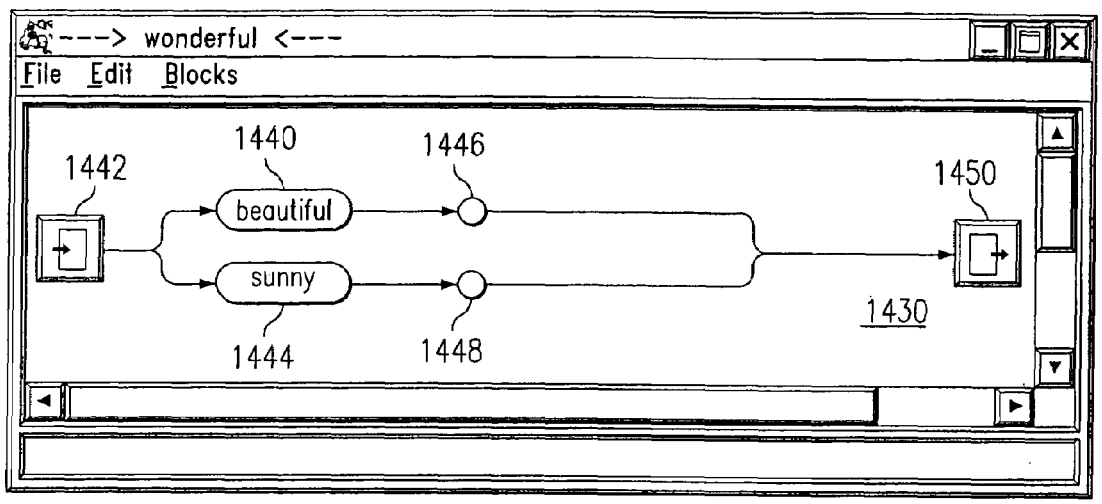
Figure 14G:
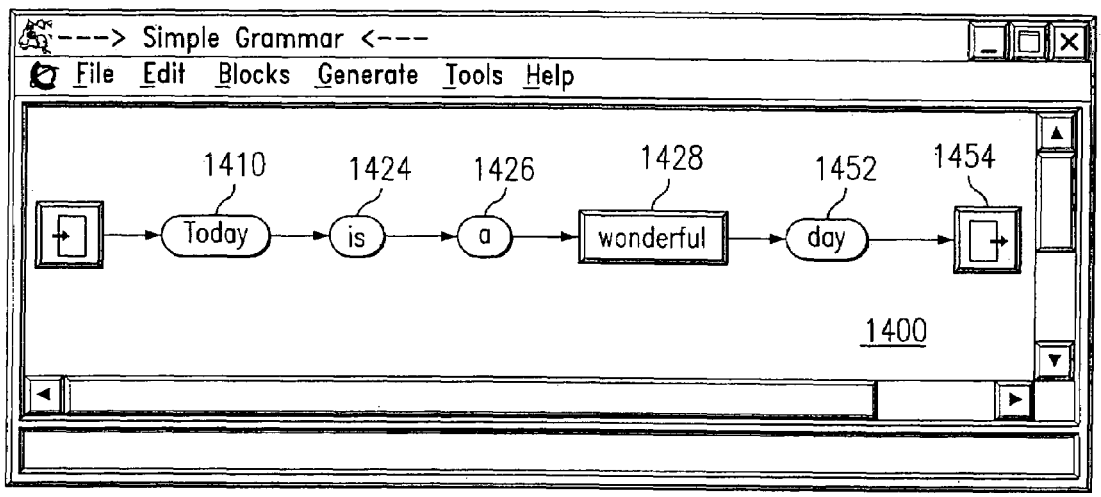

At this point, a phrase block 1428 is added to the Construction Area 1400, connected to the "a" block 1426, and labeled "wonderful." To add alternative acceptable words for "wonderful," the user double-clicks on the "wonderful" block 1428 to open a new Construction Area 1430 entitled "wonderful," as illustrated in FIG. 14E, and then connects a word block 1440 to the start block 1442 and names it "beautiful." The user then moves the "beautiful" block 1440 up (FIG. 14F) and adds another word block 1444 and names it "sunny." Each of the word blocks 1440 and 1444 are then connected to a connector block 1446, 1448, respectively, which are in turn connected to an End block 1450. The user then closes the Construction Area 1430. Referring now to FIG. 14G, a word block 1452 is added, connected to the "wonderful" block 1428 and labeled "day." The "day" block 1452 is connected to an End block 1454. The sentence may be saved as described above; i.e., by the user's clicking on the File pull-down menu, selecting the Save menu pick. At this point, if the sentence is to be used as an actual grammar, it needs to be generated by selecting the Grammar menu pick from the Generate pull-down menu.

Figure 15A:
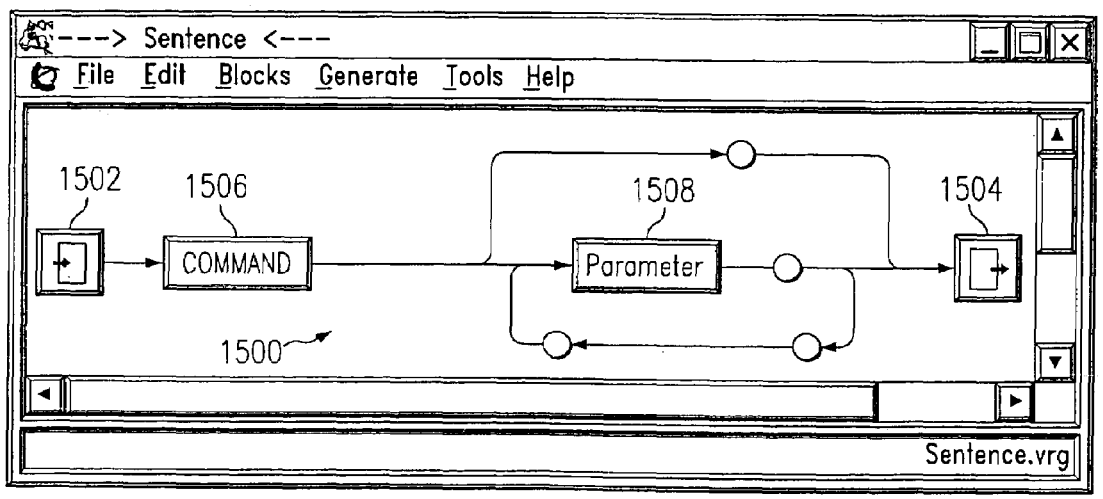
FIGS. 15A–15H illustrate a more complex grammar created using the SRG tool of FIG. 1.
Figure 15B:
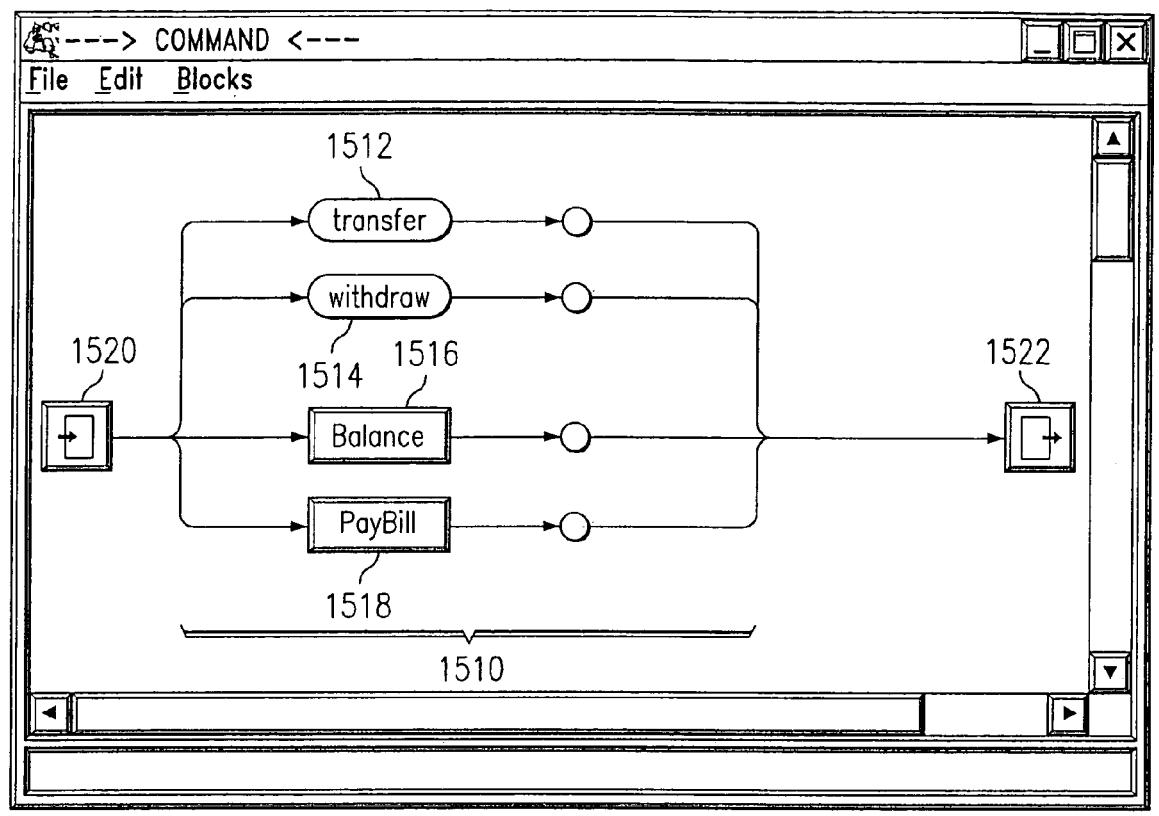

FIGS. 15A–15H illustrate a more complex banking grammar that accepts phases like "transfer $100 from my checking account to my savings account". FIG. 15A illustrates the completed grammar 1500 labeled "Sentence." As shown in FIG. 15A, the grammar 1500 comprises a start block 1502, an end block 1504, and two phrase blocks 1506 and 1508, respectively labeled "COMMAND" and "Parameter." It will be noted that the Parameter phrase block 1508 represents both an optional phrase and a looped phrase, as described above with reference to FIG. 7E. Opening the phrase block 1506 results in the display of a COMMAND phrase 1510, as illustrated in FIG. 15B. The COMMAND phrase 1510 consists of two word blocks 1512, 1514, respectively labeled "transfer" and "withdraw," and two phrase blocks 1516, 1518, respectively labeled "Balance" and "PayBill," connected as alternative between a start block 1520 and an end block 1522.

Figure 15C:
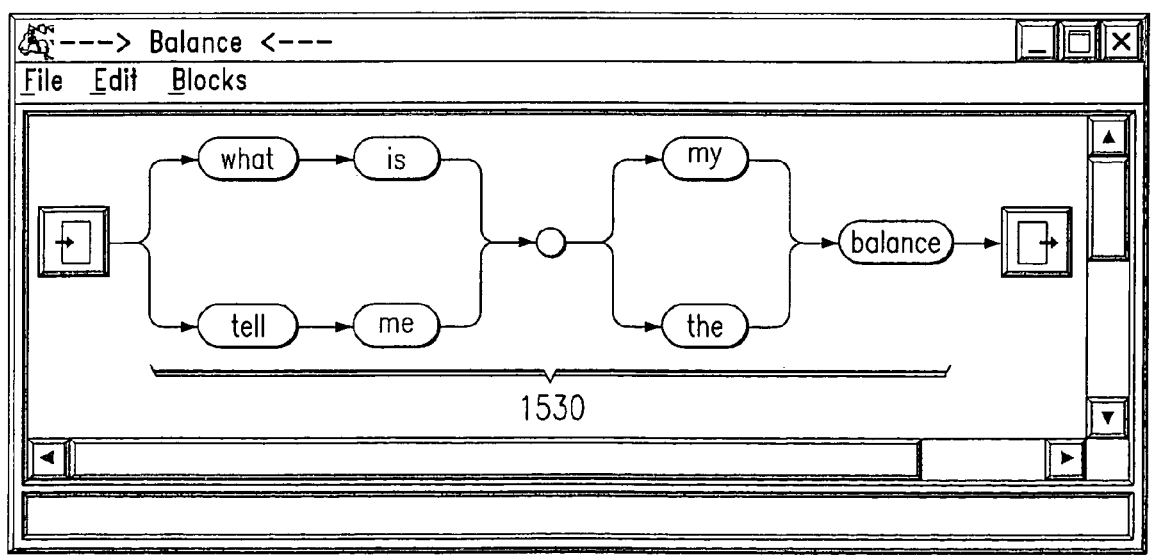

Opening the "Balance" phrase block 1516 results in the display of a Balance phrase 1530, as illustrated in FIG. 15C. As shown in FIG. 15C, the Balance phrase 1530 accepts several different phrases, including (1) "what is my balance;" (2) "what is the balance;" (3) "tell me my balance;" and (4) "tell me the balance."

Figure 15D:
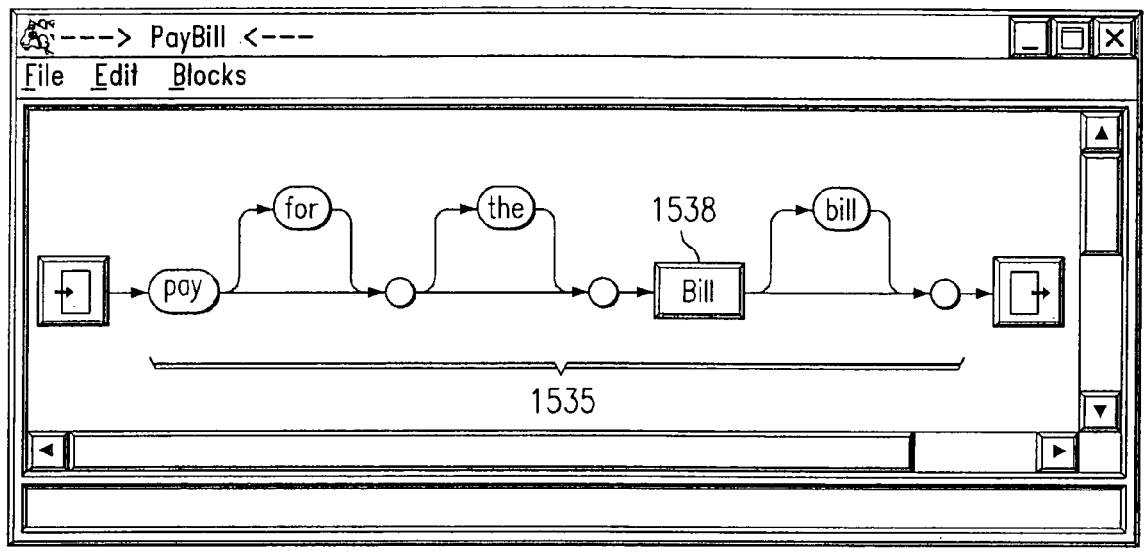
Figure 15E:
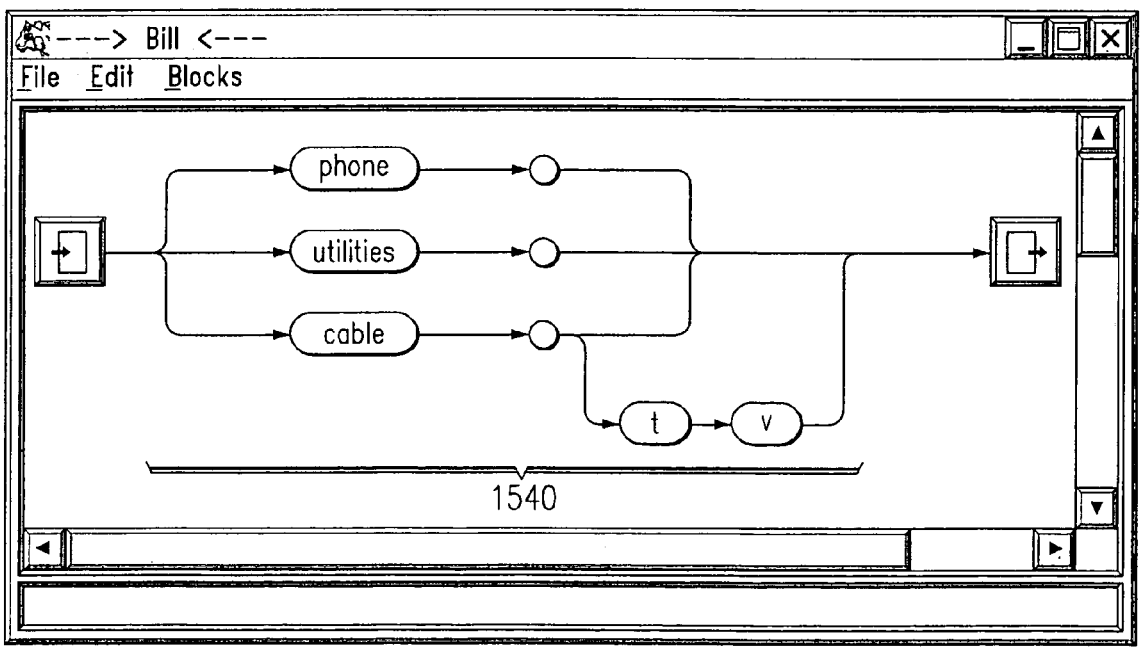

Referring again to FIG. 15B, opening the "PayBill" phrase block 1518 results in the display of a PayBill phrase 1535, as illustrated in FIG. 15D. As shown in FIG. 15D, the PayBill phase 1535 includes a phrase block 1538 labeled "Bill". Opening the Bill phrase block 1538 results in the display of a Bill phrase 1540, as illustrated in FIG. 15E. As shown in FIG. 15E, the Bill phrase 1540 accepts the phases "phone," "utilities," "cable," and "cable TV." Accordingly, referring again to FIG. 15D, the PayBill phrase 1535 accepts the following phrases (with alternative being shown in parentheses):

1. pay (phone, utilities, cable, or cable TV);
2. pay for (phone, utilities, cable, or cable TV);
3. pay for the (phone, utilities, cable, or cable TV);
4. pay (phone, utilities, cable, or cable TV) bill;
5. pay for (phone, utilities, cable, or cable TV) bill; and
6. pay for the (phone, utilities, cable, or cable TV) bill.

Figure 15F:
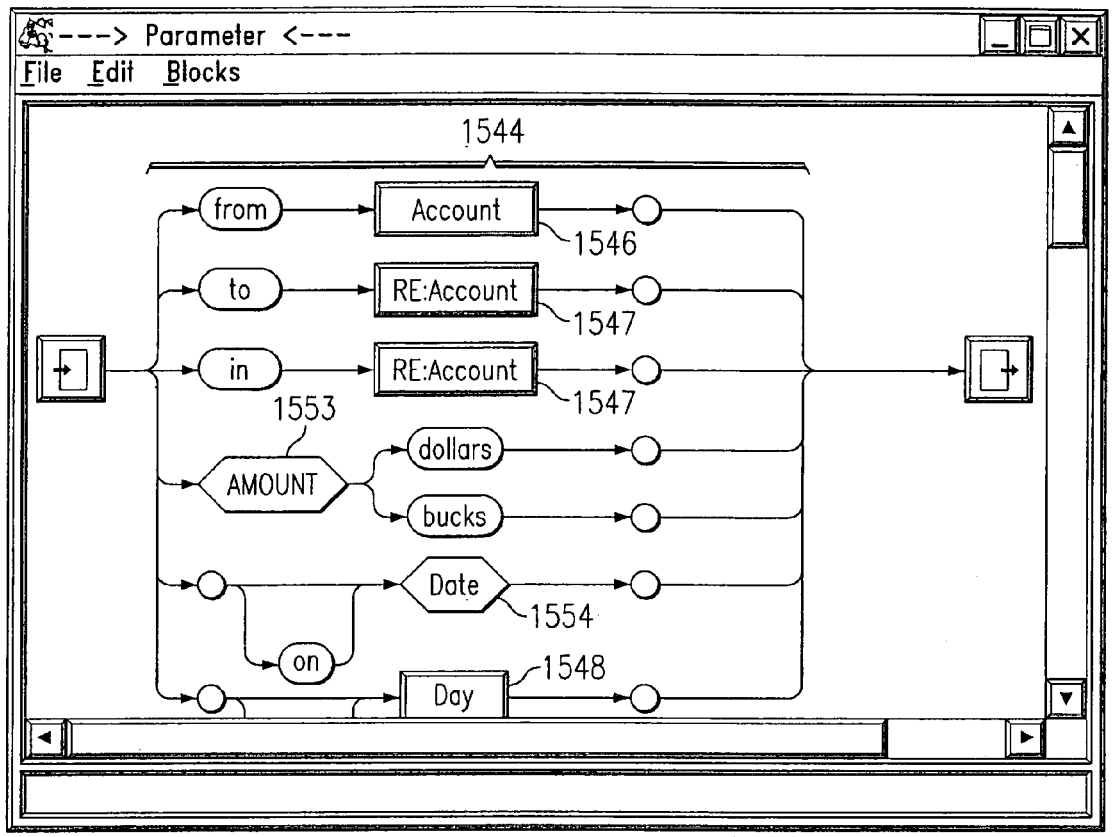

Referring again to FIG. 15A, opening the Parameter phrase block 1508 results in the display of a Parameter phrase 1544, as illustrated in FIG. 15F. The Parameter phrase 1544 includes two additional phrase blocks, including an Account phrase block 1546 (as well as two reference blocks 1547, each of which reference the Account phrase block 1546) and a Day phrase block 1548. Opening the Account phrase block 1546 results in the display of an Account phrase 1550, as illustrated in FIG. 15G. As shown in FIG. 15G, the Account phrase accepts the following phrases (again, alternative words are shown in parentheses):

1. (savings, checking, money market, credit card, ira, IRA, or mortgage);
2. my (savings, checking, money market, credit card, ira, IRA, or mortgage);
3. the (savings, checking, money market, credit card, ira, IRA, or mortgage);
4. (savings, checking, money market, credit card, ira, IRA, or mortgage) account;
5. my (savings, checking, money market, credit card, ira, IRA, or mortgage) account; and
6. the (savings, checking, money market, credit card, ira, IRA, or mortgage) account.

Figure 15H:
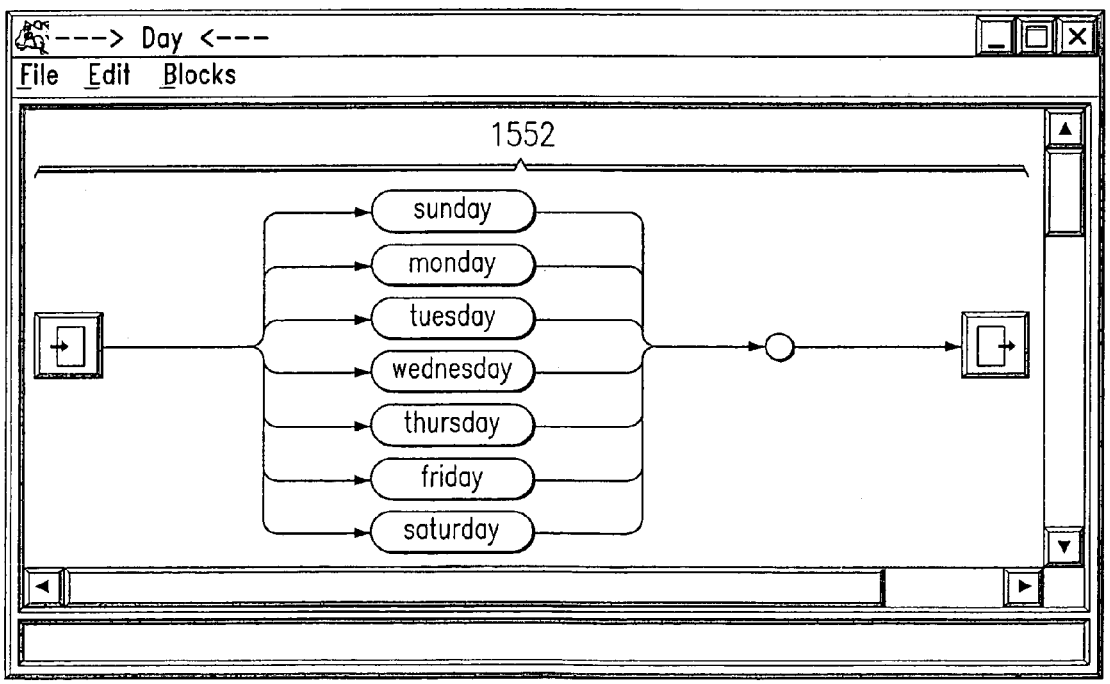
Figure 15G:
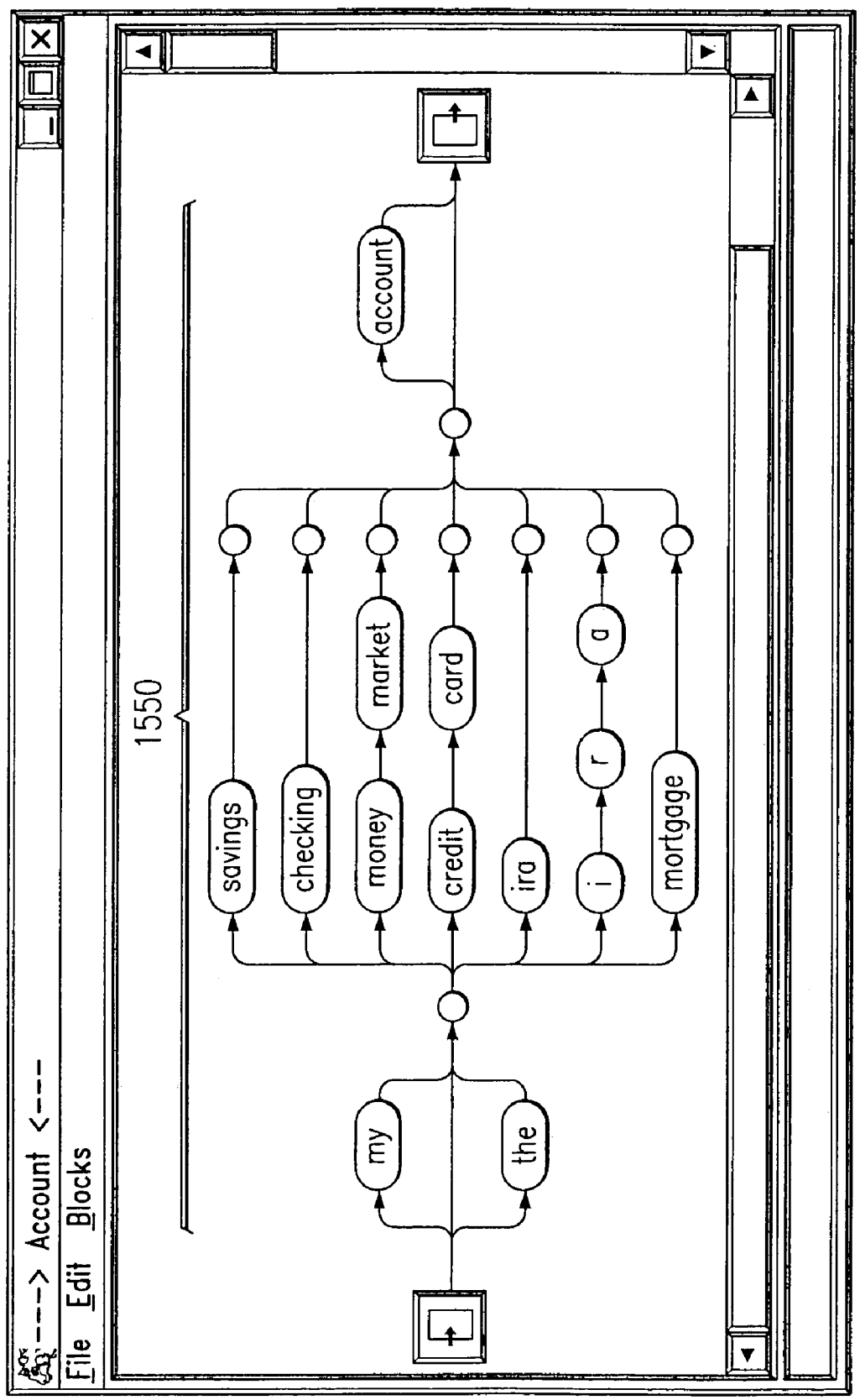

Similarly, opening the Day phrase block 1548 results in the display of a Day phrase 1552, as illustrated in FIG. 15H. As shown in FIG. 15H, the Day phrase accepts the days of the week. The Parameter phrase 1544 further includes two external blocks 1553, 1554, respectively labeled "AMOUNT" and "DATE".

As illustrated herein, the SRG tool 114 enables a user to construct a grammar, such as those illustrated herein in FIGS. 14–14G and FIGS. 15A–15H, without regard to the particular vendor in connection with which the grammar is to be used and in a graphical manner to enable the user to review all of the alternative inputs accepted by the grammar.

The above disclosure provides many different embodiments, or examples, for implementing different features of the invention. Also, specific examples of components and processes are described to help clarify the invention. These are, of course, merely examples and are not intended to limit the invention from that described in the claims.

While the invention has been particularly shown and described with reference to the preferred embodiment thereof, it will be understood by those skilled in the art that various changes in form and detail may be made therein without departing from the spirit and scope of the invention, as set forth in the following claims.

What is claimed is:

1. A method for generating a speech recognition grammar for a voice recognition system, comprising:
   (a) providing a visual area on which to graphically construct a syntax diagram,
   (b) placing a block in this area, wherein the first block represents an element of grammar of the syntax diagram,
   (c) defining the element of grammar,
   (d) placing another block in the area,
   (e) visually connecting the blocks to define a grammatical relationship between the connected blocks,
   (f) repeating steps (b) through (e) until the syntax diagram is complete, and
   (g) recursively analyzing the grammatical relationships and the elements of grammar of the syntax diagram to generate the speech recognition grammar in a compatible format for use with the speech recognition system.

2. The method of claim 1 wherein the compatible format may include a multitude of different formats, wherein each format is compatible with a specific speech recognition system.

3. The method of claim 1 wherein one of the blocks comprises a word block representing a word or letters that are acceptable input at a specific location in the grammar.

4. The method of claim 3 wherein one of the blocks comprises a reference block that references an existing subgrammar represented by a phrase block.

5. The method of claim 1 wherein one of the blocks comprises a phrase block representing a subgrammar that is acceptable input at a specific location in the speech recognition grammar.

6. The method of claim 1 wherein one of the blocks comprises an external block representing a previously defined grammar.

7. The method of claim 1 wherein one of the blocks comprises a connector block containing path information specific to a particular speech recognition system.

8. The method of claim 1 wherein the placing steps comprise selecting blocks from a tool kit displayed on a display.

9. The method of claim 1 wherein one of the blocks is selected from a group consisting of a start block and an end block.

10. A speech recognition grammar ("SRG") tool for use with a speech recognition system, the SRG tool comprising:
    means for providing a visual area on which to graphically construct a syntax diagram,
    means for a plurality of blocks in the area, wherein some of the plurality of blocks represent an element of grammar of the syntax diagram,
    means for defining the element of grammar,
    means for placing another block in the area,
    means for visually connecting the blocks to define a grammatical relationship between the connected blocks, and
    means for recursively analyzing the grammatical relationships and the elements of grammar of the syntax diagram to generate the speech recognition grammar in a compatible format for use with the speech recognition system.

11. The SRG tool of claim 10 wherein one of the blocks comprises a word block representing a word or letters that are acceptable input at a specific location in the grammar.

12. The SRG tool of claim 11 wherein one of the blocks comprises a reference block that references an existing subgrammar represented by a phrase block.

13. The SRG tool of claim 10 wherein one of the blocks comprises a phrase block representing a subgrammar that is acceptable input at a specific location in the grammar.

14. The SRG tool of claim 10 wherein one of the blocks comprises an external block representing a grammar defined outside of the SRG tool.

15. The SRG tool of claim 10 wherein one of the blocks comprises a connector block containing path information specific to a particular speech recognition system.

16. The SRG tool of claim 10 wherein one of the blocks is selected from a group consisting of a start block and an end block.

17. A computer program product for constructing a syntax diagram representing a speech recognition grammar for a speech recognition system, the computer program product comprising:
    a computer program processable by a computer system, the computer program comprising a plurality of instructions, including:
       instructions for enabling a user to select a block comprising a graphical display element to represent an element of the grammar;

instructions for enabling a user to connect the selected block to at least one other block;

instructions for enabling a user to define what is represented by the selected block; and instructions for recursively analyzing grammatical relationships and the elements of grammar to generate the speech recognition grammar in a compatible format for use with the speech recognition system.

18. The computer program product of claim 17 wherein the selected block comprises a block selected from the group consisting of a word block representing a word or letters that are acceptable input at a specific location in the grammar, a phrase block representing a subgrammar that is acceptable input at a specific location in the grammar, an external block representing a grammar defined outside of the computer program product, a reference block that references an existing subgrammar represented by a phrase block, and a connector block containing path information specific to a particular speech recognition system.

* * * * *

UNITED STATES PATENT AND TRADEMARK OFFICE
CERTIFICATE OF CORRECTION

PATENT NO. : 7,031,907 B1 Page 1 of 1
APPLICATION NO. : 09/978814
DATED : April 18, 2006
INVENTOR(S) : Christopher F. Passaretti and Daniel D. Evans It is certified that error appears in the above-identified patent and that said Letters Patent is hereby corrected as shown below:

TITLE PAGE, ITEM (54):
The title of the application should read as -- GUI TOOLBOX FOR MANUALLY DIAGRAMMING AND RECURSIVELY COMPILING VOICE RECOGNITION GRAMMARS --.

TITLE PAGE, ABSTRACT (57):
Line 1, "voice" should be replaced with the word -- speech --.
Line 1, "("VRG")" should be be replaced with -- ("SRG") --.
Line 3, "VRG" should be replaced with -- SRG --.
Line 9, "VRG" should be replaced with -- SRG --.
Line 16, "voice" should be replaced with -- speech --.

Signed and Sealed this

Nineteenth Day of December, 2006

JON W. DUDAS
*Director of the United States Patent and Trademark Office*